(12) United States Patent
Park

(10) Patent No.: US 8,023,472 B2
(45) Date of Patent: Sep. 20, 2011

(54) METHOD FOR IDENTIFYING HOME CELL AND APPARATUS THEREOF

(75) Inventor: Sun-Yong Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1368 days.

(21) Appl. No.: 11/474,492

(22) Filed: Jun. 26, 2006

(65) Prior Publication Data

US 2006/0291427 A1 Dec. 28, 2006

(30) Foreign Application Priority Data

Jun. 25, 2005 (KR) .................. 10-2005-0055431

(51) Int. Cl.
*H04B 7/216* (2006.01)

(52) U.S. Cl. ........ 370/335; 370/331; 455/521; 455/436; 455/442; 455/437; 455/556.2

(58) Field of Classification Search .................. 370/331; 455/521, 436, 439, 442, 437, 556.2
See application file for complete search history.

(56) References Cited

U.S. PATENT DOCUMENTS

| 6,044,261 | A | | 3/2000 | Kazami | |
|---|---|---|---|---|---|
| 6,321,087 | B1 | * | 11/2001 | Do .................. | 455/436 |
| 6,731,623 | B2 | * | 5/2004 | Lee et al. .................. | 370/349 |
| 2003/0114160 | A1 | * | 6/2003 | Verkama et al. .............. | 455/445 |
| 2004/0152462 | A1 | * | 8/2004 | Hwang .................. | 455/432.1 |
| 2004/0224684 | A1 | * | 11/2004 | Dorsey et al. .................. | 455/434 |
| 2005/0136937 | A1 | * | 6/2005 | Qian et al. .................. | 455/452.2 |
| 2005/0141558 | A1 | * | 6/2005 | Connors .................. | 370/469 |
| 2007/0147317 | A1 | * | 6/2007 | Smith et al. .................. | 370/338 |

FOREIGN PATENT DOCUMENTS

| EP | 1379096 | 1/2004 |
|---|---|---|
| KR | 2004-0074388 | 8/2004 |
| WO | WO 98/10614 | 3/1998 |

* cited by examiner

*Primary Examiner* — Nimesh Patel

(74) *Attorney, Agent, or Firm* — Roylance, Abrams, Berdo & Goodman, L.L.P.

(57) ABSTRACT

A method for identifying a cell that provides a differentiated service in a mobile communication system. The method comprises searching for a plurality of pilots having strength greater than a minimum pilot strength; comparing strengths of the pilots, and designating a pilot having the greatest strength as an active pilot; determining whether a corresponding cell of the active pilot transmits a cell classifier for the differentiated service along with an overhead message; if the corresponding cell transmits a cell classifier, determining whether the cell classifier matches a cell classifiers stored in an access terminal; and if the cell classifier matches with a cell classifier stored in the access terminal, performing an operation under the control of the corresponding cell.

8 Claims, 13 Drawing Sheets

METHOD FOR IDENTIFYING HOME CELL AND APPARATUS THEREOF

CROSS-REFERENCE TO RELATED PATENT APPLICATION

This application claims the benefit under 35 U.S.C. §119(a) of Korean Patent Application No. 2005-55431, filed Jun. 25, 2005, in the Korean Intellectual Property Office, the entire disclosure of which is hereby incorporated by reference.

BACKGROUND OF THE INVENTION

1. Field of the Invention

The present invention relates to a method and apparatus for searching for an active pilot in a mobile communication access network. More particularly, the present invention relates to a method and apparatus for searching for an active pilot of a home cell so as to provide a service differentiated from that of a public network in the cdma2000 1xEV-DO and cdma2000 1xRTT access networks.

2. Description of the Related Art

Active research is ongoing on technologies related to high speed data transmission in a Code Division Multiple Access (CDMA) mobile communication system. A 1x Evolution-Data Only (1xEV-DO) system is a conventional mobile communication system having a channel structure for the high-speed data transmission. The 1xEV-DO system is a mobile communication system supporting the standard proposed in $3^{rd}$ Generation Partnership Project 2 (3GPP2) to make up for the shortcomings in the IS-2000 system.

In the cdma2000 1xEV-DO and cdma2000 1xRTT mobile communication access networks, an access terminal or mobile station selects an active pilot for monitoring by considering only pilot strengths. In doing so, the access terminal receives an overhead message from the cell that it is monitoring, and receives information on the corresponding cell and information on neighbor cells using the overhead message. A configuration of such cells is shown in FIG. 1.

FIG. 1 is a diagram illustrating a configuration of an access network in a mobile communication network in which public cells and home cells coexist. FIG. 2 is a flowchart illustrating a method in which an access terminal searches for an active pilot for monitoring, in a conventional mobile communication network.

Referring to FIG. 1, home cells $P_{h1}$ to $P_{h23}$ exist in public cells $P_{pub1}$ (110), $P_{pub2}$ (120), and $P_{pub3}$ (130). In the mobile communication network of FIG. 1, a general access terminal searches for an active pilot according to the procedure of FIG. 2.

Referring to FIG. 2, in step 200, the access terminal searches for a pilot in an access network where public cells and home cells coexist. In step 210, the access terminal measures strengths of pilots P1, P2 and P3, and determines the strongest pilot $P_{strongest}$ among them. In step 220, the access terminal determines whether the strength of the strongest pilot $P_{strongest}$ is greater than a minimum pilot strength $P_{min}$. If the strongest pilot $P_{strongest}$ is greater than the minimum pilot $P_{min}$, the access terminal sets $P_{strongest}$ as the active pilot $P_a$ in step 230. Otherwise, the access terminal returns to step 200. In step 230, the access terminal receives an overhead message from a cell corresponding with the strongest pilot $P_{strongest}$. If there is a request for new pilot search in step 240, the access terminal returns to step 200 and repeats its succeeding steps. Otherwise, the access terminal returns to step 230.

As described above, in the conventional cdma2000 1xEV-DO and cdma2000 1xRTT access networks, the access terminal selects an active pilot for monitoring by considering only pilot strengths. Therefore, in the access network where public cells and home cells coexist, even though a user is located in the service coverage area of the home cell in which it is registered to receive a differentiated service, and the strength of a pilot for the home cell is high enough to receive the service, if the strength of a pilot of a neighbor public cell is higher than the pilot strength of the home cell, the home cell cannot provide a stable and satisfactory differentiated service because the service will not be based on the pilot of the home cell. In addition, while monitoring a public cell or a home cell using the active pilot, the access terminal cannot provide information indicating the possibility of the service differentiated from that of neighbor cells, and therefore has difficulty in providing the differentiated service.

Accordingly, there is a need for an improved method and apparatus for searching for an active pilot of a home cell so as to provide a service differentiated from that of a public network in a mobile communication access network.

SUMMARY OF THE INVENTION

Exemplary embodiments of the present invention address at least the above problems and/or disadvantages and provide at least the advantages described below. Accordingly, an exemplary aspect of the present invention is to provide a method and apparatus for searching for an active pilot of a home cell so as to provide a service differentiated from that of a public network in a mobile communication access network.

It is another exemplary aspect of the present invention to provide a method and apparatus for guaranteeing service continuity between a public cell and a home cell and providing a differentiated service to improve competitiveness of the home cell as a subscriber's home or indoor solution in a mobile communication network in which the home cell is used.

According to one exemplary aspect of the present invention, there is provided a method for identifying a cell that provides a differentiated service in a mobile communication system. The method comprises the steps of searching for a plurality of pilots having strength greater than a minimum pilot strength; comparing strengths of the pilots, and designating a pilot having the greatest strength as an active pilot; determining whether a corresponding cell of the active pilot transmits a cell classifier for the differentiated service along with an overhead message; if the corresponding cell transmits a cell classifier, determining whether the cell classifier matches a cell classifiers stored in an access terminal; and if the cell classifier matches with a cell classifier stored in the access terminal, performing an operation under the control of the corresponding cell.

According to another exemplary aspect of the present invention, there is provided a base transceiver system (BTS) apparatus for identifying a cell that provides a differentiated service in a mobile communication system. The BTS apparatus comprises a cell information provider for redefining a message including subscriber information indicating whether the BTS provides the differentiated service; a traffic transceiver for transmitting/receiving voice and data traffics to/from an access terminal; a controller for processing information provided from the cell information provider and the traffic transceiver such that the access terminal can identify a cell capable of providing the differentiated service; and a radio frequency (RF) processor for, under the control of the controller, combining the redefined message and the traffics such that the access terminal can identify the cell capable of providing the differentiated service, and performing thereon a serious of communication processes in a physical layer or a media access control (MAC) layer.

According to a further exemplary aspect of the present invention, there is provided an access terminal (AT) apparatus for identifying a cell that provides a differentiated service in a mobile communication system. The AT apparatus comprises a radio frequency (RF) processor for receiving a frame transmitted from a base transceiver system (BTS), and performing thereon a series of communication processes in a physical layer or a media access control (MAC) layer; a traffic transceiver including a buffer therein, for storing traffic data transmitted from the RF transceiver; a controller for comparing a pilot signal from its own cell with a pilot signal from a neighbor cell according to a predetermined procedure, and identifying a cell capable of providing the differentiated service depending on the comparison result; and a cell information parser for parsing a corresponding field of a received message under the control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention define a scheme for providing a service differentiated from that of a public network. The service is provided according to a characteristic of a subscriber's home solution, where a low-capacity base transceiver system (BTS) is installed in a subscriber's home as the subscriber's home solution in addition to the public cell installed and managed by a service provider in the cdma2000 1xEV-DO and cdma2000 1xRTT access network. The differentiation between the public cell and the home cell supports a procedure in which an access terminal recognizes the home cell in which it is registered as a differentiated service user. Further, while the home cell is described as being part of a subscriber's home solution installed in a subscriber's home, the home cell could be part of any network other than the public network. Further, the home cell could be located anywhere as long as the coverage area for the home cell and the public cell at least partially overlap.

Exemplary embodiments of the present invention define a scheme for supporting differentiated accounting, and also define a dormant state between the public cell and the home cell and an active seamless handoff scheme while supporting the differentiated accounting. In addition, exemplary embodiments of the present invention define the requirements and provisioning scheme in each network element including the access terminal required for supporting these services.

Figure 1:
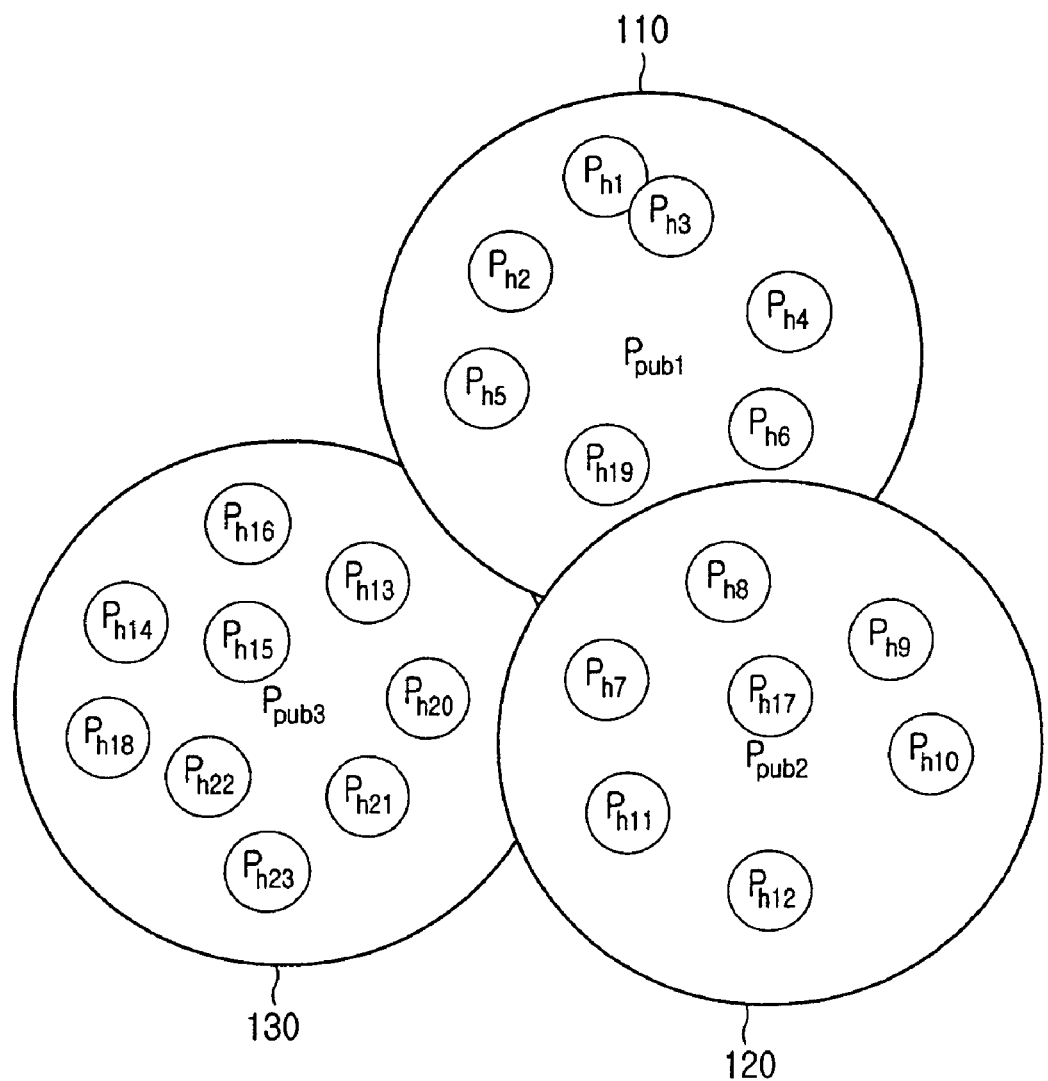
FIG. 1 is a diagram illustrating a configuration of an access network in a mobile communication network in which public cells and home cells coexist.
Figure 2:
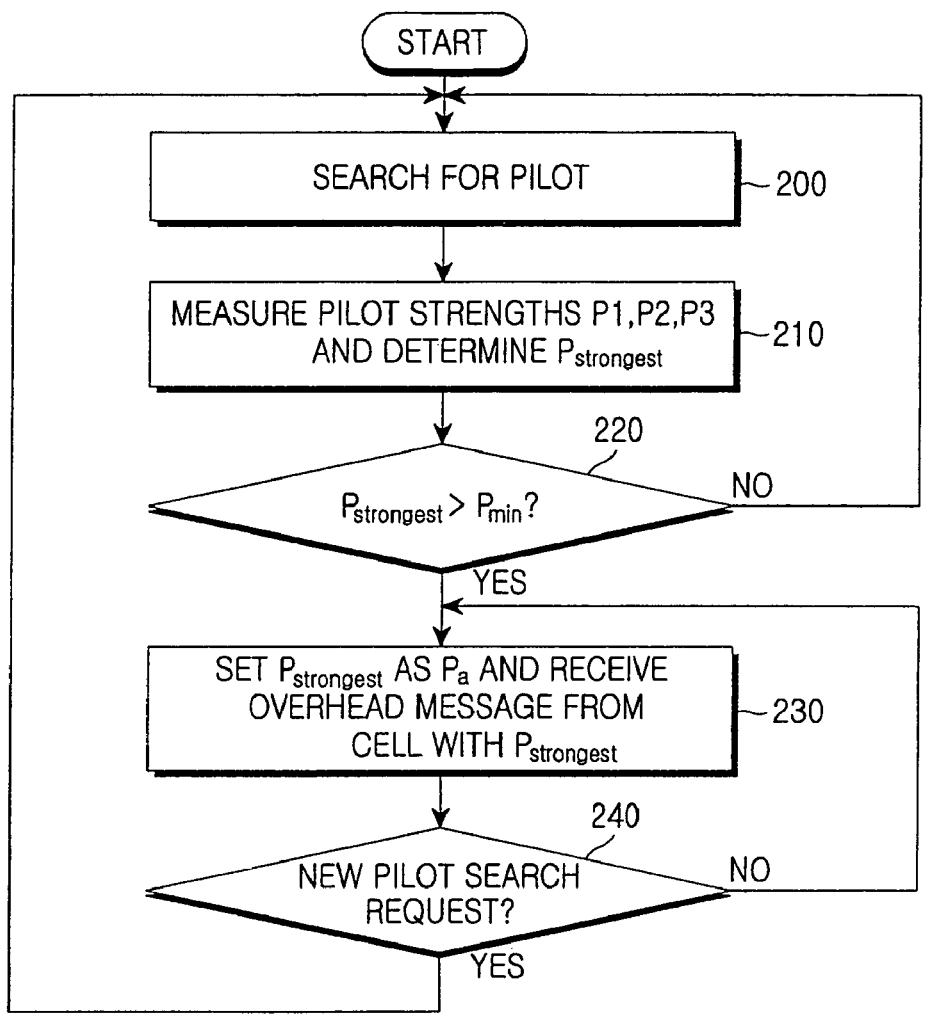
FIG. 2 is a flowchart illustrating a method in which an access terminal searches for an active pilot for monitoring, in a conventional mobile communication network.

Exemplary embodiments of the present invention propose two schemes applicable to the cdma2000 1xEV-DO and cdma2000 1xRTT access networks where a new home cell, which is a subscriber's home solution, is added to the existing public network in the cdma2000 1xEV-DO and cdma2000 1xRTT access networks shown in FIG. 1, and each of the schemes includes an access terminal (AT), a public BTS, and a home BTS.

Although exemplary embodiments of the present invention will be described with reference to the cdma2000 communication system, it can also be applied to other communication systems such as the UMTS and OFDM-based networks. In addition, it would be obvious to those skilled in the art that an embodiment of the present invention can be applied to any communication system including the public cells and home cells with broader cell coverage and other cells with narrower cell coverage.

An operation of the proposed scheme applicable to the cdma2000 1xEV-DO and cdma2000 1xRTT access networks is roughly divided into two operations. In a first operation, an access terminal identifies a home cell and selects the home cell with an active pilot in the situation where public cells and home cells coexist. A second operation defines the conditions that the access terminal and the BTS should support to perform such an operation. Each operation will be described in detail herein below.

Figure 3:
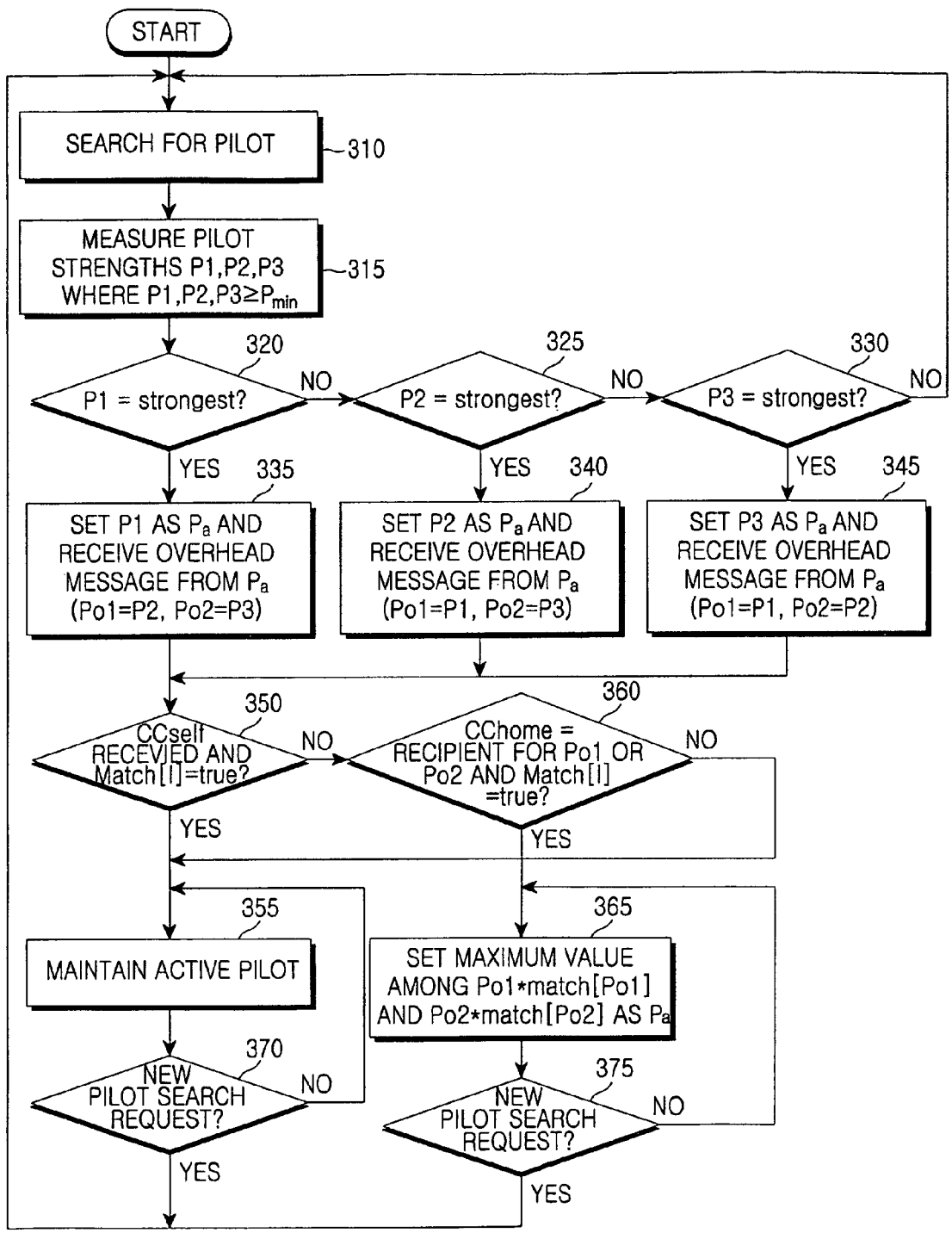
FIG. 3 is a flowchart illustrating a method for identifying and selecting a home cell by an access terminal according to an exemplary embodiment of the present invention.

FIG. 3 is a flowchart illustrating a method for identifying and selecting a home cell by an access terminal according to an exemplary embodiment of the present invention.

Referring to FIG. 3, in step 310, an access terminal searches for a pilot. In step 315, if the minimum pilot strength for receiving a service in a particular cell is defined as $P_{min}$, the access terminal searches for pilots P1, P2 and P3, whose strengths are higher than $P_{min}$, in a pilot search procedure. The use of three pilots is merely exemplary as any number of pilots may be used. In steps 320 to 330, the access terminal determines which of the pilots P1, P2 and P3 has the highest strength. In steps 335 to 345, the access terminal designates the determined pilot having the highest strength as an active pilot $P_a$ and receives an overhead message from the cell associated with the $P_a$. For $P_a$=P1, the access terminal sets Po1=P2 and Po2=P3, where Po1 and Po2 denote 1D1 and 1D2 of non-active pilots. For $P_a$=P2, the access terminal sets Po1=P1 and Po2=P3. For $P_a$=P3, the access terminal sets Po1=P1 and Po2=P2.

In step 350, the access terminal determines whether the cell associated with the corresponding active pilot transmits a cell classifier CCself for a classified service. If the corresponding cell transmits the cell classifier CCself, the access terminal determines whether the cell classifier CCself matches with any one of the cell classifiers CCself stored therein. Herein, Match[I] indicates an operation of comparing the cell classifier CCself received for each pilot with the previously stored cell classifiers. Match[I] is set to '1' if the cell classifier CCself is received for each pilot. Otherwise, Match[I] is set to '0'. I denotes an integer which is greater than or equal to 0 and less than or equal to N. If it is determined in step 350 that the transmitted cell classifier CCself matches with any stored cell classifier CCself, the access terminal is controlled by the corresponding cell, receiving the differentiated service in the corresponding cell. In step 355, if there is a matched cell classifier CCself, the access terminal maintains the initial pilot having the highest strength as an active pilot, receives an overhead message from the corresponding cell, and performs an idle mode operation.

However, if it is determined in step 350 that the cell associated with the active pilot does not transmit a cell classifier CCself, or the transmitted cell classifier CCself, if any, is not matched with any stored cell classifier CCself, the access terminal receives an overhead message for transmitting cell classifier information CChome for a neighbor cell, and performs a match operation on the received neighbor cell classifier CChome in step 360. If there is a match, the access terminal, in step 365, sets one of Po1*Match[Po1] and Po2*Match[Po2], having the maximum value, as $P_a$, for the matched cell classifier among the cell classifiers CChome associated with the Po1 and Po2, and receives an overhead message of the corresponding cell. If there is no match, the access terminal maintains the initial pilot having the highest strength as an active pilot in step 355.

In steps 370 to 375, the access terminal determines if there is a new pilot search request. The above procedure can be applied to both the cdma2000 1xEV-DO and cdma2000 1xRTT access networks. However, a message for transmitting the self-cell classifier information and the neighbor cell classifier information differs according to the access networks, and will be referred to in the following definition of the message and its fields.

The BTS and the access terminal should satisfy the following requirements for the home cell identification. In the cdma2000 1xEV-DO and cdma2000 1xRTT access networks where public cells and home cells coexist, the access terminal follows the procedure of FIG. 3 in order to classify and select a home cell where it is registered to receive a differentiated service. To follow this procedure, the BTS should add a cell classifier field indicating home cell information to the message format defined below before transmissions in order to notify the presence of the home cell where the access terminal receives an overhead message and is registered as a user. A definition of a procedure should be made in which the access terminal receiving the cell classifier compares the received cell classifier with a home cell list input by the user or a previously stored home cell list in order to determine whether the corresponding cell is the home cell where it is registered.

This procedure corresponds to step 350 and 360 in which the access terminal receives the cell classifier CCself/CChome and compares the received cell classifier with the home cell list stored in its memory. The BTS provides a call only to the subscriber registered therein, and denies a call for the non-registered subscribers, or provides a non-differentiated service to the non-registered subscribers. For this purpose, the BTS has a subscriber list for the differentiated service of the home cell. That is, both the access terminal and the BTS have a user list or a home cell list for the differentiated service. For example, an International Mobile Station Identity (IMSI) or Network Access Identifier (NAI) can be stored in the BTS as user information.

Messages and fields thereof used by the BTS and the access terminal will be described herein below.

Table 1 shows a QuickConfig message after modification, and this message transmits a specific ID of a cell associated with an access terminal in an idle/dormant state, to the access terminal.

TABLE 1

| Field | Length (bits) |
| --- | --- |
| MessageID | 8 |
| ColorCode | 8 |
| SectorID24 | 24 |
| SectorSignature | 16 |
| AccessSignature | 16 |
| Redirect | 1 |
| RPCCount63To0 | 6 |
| RPCCount63To0 occurrences of the following field: | |
| ForwardTrafficValid63To0 | 1 |
| RPCCount127To64Included | 0 or 1 |
| RPCCount127to64 | 0 or 6 |
| RPC127To64 occurrences of the following field: | |
| ForwardTrafficValid127To64 | 0 or 1 |
| CellClassifierIncluded | 0 or 1 |
| CellClassigierLength | 8 |
| CellClassifier | 0 or (CellClassifierLength + 1) × 8 |
| Reserved | 0-7 (as needed) |

CellClassifierIncluded: It indicates whether the message includes a cell-specific ID for supporting a differentiated service in the home cell, like in a user zone. CellClassifierIncluded is set to '1' when the corresponding cell transmits the cell-specific ID for supporting the service differentiated from that of other cells so that the access terminal receiving the cell-specific ID may include it in the message. Otherwise, CellClassifierIncluded is set to '0'.

CellClassifierLength: If CellClassifierIncluded is set to '1', it is expressed in bytes with a value which is less by 1 than a length of CellClassifier included in this message. Otherwise, CellClassifierLength is omitted.

CellClassifier: If CellClassifierIncluded is set to '1', it is set as a specific value having a length of CellClassifierLength. Otherwise, CellClassifier is omitted. This value is for supporting the service specialized in the cell, and can be used for a virtual zone.

Table 2 shows a SectorParameters after modification, and this message transmits specific IDs of neighbor cells to the access terminal in the idle/dormant state.

TABLE 2

| Field | Length (bit) |
|---|---|
| MessageID | 8 |
| CountryCode | 8 |
| SectorID | 128 |
| SubnetMask | 8 |
| SectorSignature | 16 |
| Latitude | 22 |
| Longitude | 23 |
| RouteUpdateRadius | 11 |
| LeapSeconds | 8 |
| LocalTimeOffset | 11 |
| ReverseLinkSilenceDuration | 2 |
| ReverseLinkSilencePeriod | 2 |
| ChannelCount | 5 |
| ChannelCount occurrences of the following field: | |
| Channel | 24 |
| NeighborCount | 5 |
| NeighborCount occurrences of the following field: | |
| NeighborPilotPN | 9 |
| NeighborCount occurrences of the following two fields: | |
| NeighborChannelIncluded | 1 |
| NeighborChannel | 0 or 24 |
| NeighborSearchWindowSizeIncluded | 1 |
| NeighborCount occurrences of the following field: | |
| NeighborSearchWindowSize | 0 or 4 |
| NeighborSearchWindowOffsetIncluded | 1 |
| NeighborCount occurrences of the following field: | |
| NeighborSearchWindowOffset | 0 or 3 |
| RouteUpdateTriggerCodeIncluded | 0 or 1 |
| RouteUpdateTriggerCode | 0 or 12 |
| RouteUpdateTriggerMaxAge | 0 or 4 |
| FPDCHSupportIncluded | 0 or 1 |
| m, 0 <= m <= Count occurrences of the following field: | |
| FPDCHSupported | 0 or 1 |
| CellClassifierIncluded | 1 |
| CellClassiferMap | NeighborCount |
| CellClassifierLengthAll | 1 |
| One or NeighborCount occurrences of the following field: | |
| CellClassifierLength | 8 |
| NeighborCount occurrences of the following field: | |
| CellClassifier | (CellClassifierLength + 1) × 8 |
| Reserved | 0-7 (as needed) |

CellClassifierIncluded: It is set to '1' if the message includes cell classifier information for each neighbor pilot. Otherwise, it is set to '0'.

CellClassifierMap: It indicates whether the message includes a cell classifier for each neighbor pilot included in the message. If CellClassifierIncluded is set to '1', this field is set as follows. Otherwise, this field is omitted. CellClassifierMap is set to '1' if the cell classifier is included in bits from the included first pilot to last pilot. Otherwise, CellClassifierMap is set to '0'.

CellClassifierLengthAll: If CellClassifierIncluded is set to '1', this field is set as follows. Otherwise, this field is omitted. If all neighbor pilots included in this message are equal in length of CellClassifier, CellClassifierLengthAll is set to '1'. Otherwise, CellClassifierLengthAll is set to '0'.

CellClassifierLength: If CellClassifierIncluded is set to '1', this field is set as follows. Otherwise, this field is omitted. If CellClassifierLengthAll is set to '1', the number of this fields included in the message is one. It is expressed in bytes with a value which is less by 1 than a length in common to every CellClassifier. Otherwise, this field includes a length of CellClassifier sequentially included in this message according to the number of bits expressed with '1' in CellClassifierMap.

CellClassifier: If CellClassifierIncluded is set to '1', this field is set as follows. Otherwise, this field is omitted. CellClassifier is expressed with a designated length in order of CellClassifier set to '1' in CellClassifierMap. It is set as a cell-specific ID for the neighbor pilot. This value is for supporting the service specialized in the cell, and can be used for a virtual zone.

Table 3 shows a NeighborList message, and this message transmits a specific ID of a neighbor cell to an access terminal in an active state.

TABLE 3

| Field | Length (bits) |
|---|---|
| MessageID | 8 |
| Count | 5 |
| Count occurrences of the following field: | |
| PilotPN | 9 |
| Count occurrences of the following two fields: | |
| ChannelIncluded | 1 |
| Channel | 24 |
| SearchWindowSizeIncluded | 1 |
| Count occurrences of the following field: | |
| SearchWindowSize | 0 or 4 |
| SearchWindowOffsetIncluded | 1 |
| Count occurrences of the following field: | |
| SearchWindowOffset | 0 or 3 |
| CellClassifierIncluded | 1 |
| CellClassiferMap | Count |
| CellClassifierLengthAll | 1 |
| One or Count occurrences of the following field: | |
| CellClassifierLength | 8 |
| Count occurrences of the following field: | |
| CellClassifier | (CellClassifierLength + 1) × 8 |
| Reserved | 0-7 (as needed) |

CellClassifierIncluded: CellClassifierIncluded is set to '1' if the message includes cell classifier information for each neighbor pilot. Otherwise, CellClassifierIncluded is set to '0'.

CellClassifierLengthAll: If CellClassifierIncluded is set to '1', this field is set as follows. Otherwise, this field is omitted. CellClassifierLengthAll is set to '1' if CellClassifier of every neighbor pilot included in this message is equal in length. Otherwise, CellClassifierLengthAll is set to '0'.

CellClassifierLength: If CellClassifierIncluded is set to '1', this field is set as follows. Otherwise, this field is omitted. If CellClassifierLengthAll is set to '1', the number of this fields included in the message is one. It is expressed in bytes with a value which is less by 1 than a length in common to every CellClassifier. Otherwise, this field includes a length of CellClassifier sequentially included in this message according to the number of bits expressed with '1' in CellClassifierMap.

CellClassifier: If CellClassifierIncluded is set to '1', this field is set as follows. Otherwise, this field is omitted. CellClassifier is expressed with a designated length in order of CellClassifier set to '1' in CellClassifierMap. It is set as a cell-specific ID for the neighbor pilot. This value is for supporting the service specialized in the cell, and can be used for a virtual zone.

Next, Scheme 1 in the cdma2000 1xRTT access network will be described.

Scheme 1 is for guaranteeing more freedom of the operator in cell configuration for supporting the differentiation in the cdma2000 1xRTT access network, and defines messages and fields thereof.

Table 4 shows the fields added to the last parts of a System Parameters message, an ANSI-41 System Parameters message, and an MC-RR Parameters message, and a corresponding cell transmits its cell-specific ID to an access terminal in the idle/dormant state.

TABLE 4

| Field | Length (bits) |
|---|---|
| CELL_CLASSIFIER_INCL | 1 |
| CELL_CLASSIFIER_LEN | 0 or 4 |
| CELL_CLASSIFIER | 0 or (CELL_CLASSIFIER_LEN + 1) × 8 |

CELL_CLASSIFIER_INCL: It indicates whether the message includes a cell-specific ID for supporting a differentiated service in the home cell, like in a user zone. CELL_CLASSIFIER_INCL is set to '1' when the corresponding cell transmits the cell-specific ID for supporting the service differentiated from that of other cells so that the access terminal receiving the cell-specific ID may include it in the message. Otherwise, CELL_CLASSIFIER_INCL is set to '0'.

CELL_CLASSIFIER_LEN: If CELL_CLASSIFIER_INCL is set to '1', it is set in bytes with a value which is less by 1 than a length of a cell classifier of the corresponding cell. Otherwise, CELL_CLASSIFIER_LEN is omitted.

CELL_CLASSIFIER: If CellClassifier is set to '1', it transmits a specific ID of the corresponding cell. Otherwise, CELL_CLASSIFIER is omitted. This value is for supporting the service specialized in the cell, and can be used for a virtual zone.

Table 5 shows Base Station Status Response Information Record message after modification.

TABLE 5

| Field | Length (bits) |
|---|---|
| NUM_PILOTS | 4 |
| SID_NID_IND | 1 |
| NUM_PILOTS occurrences of the following record: | |
| { (NUM_PILOTS) | |
| RECORD_LEN | 4 |
| PILOT_PN | 9 |
| BASE_ID | 16 |
| SDI_NID_INCL | 0 or 1 |
| SID | 0 or 15 |
| NID | 0 or 16 |
| BASE_LAT_LONG_INCL | 1 |
| BASE_LAT | 0 or 22 |
| BASE_LONG | 0 or 23 |
| CELL_CLASSIFIER_INCL | 1 |
| CELL_CLASSIFIER_MAP | 0 or NUM_PILOTS |
| CELL_CLASSIFIER_LEN_ALL | 0 or 1 |
| Zero, one or N occurrences of the following field: | |
| CELL_CLASSIFIER_LEN | 0 or 4 |
| Zero or N occurrences of the following field: | |
| CELL_CLASSIFIER | 0 or (CELL_CLASSIFIER + 1) × 8 |
| RESERVED_1 | 0-7 (as required) |
| } (NUM_PILOTS) | |

CELL_CLASSIFIER_INCL: This field is set to '1' if the message includes cell classifier information for each neighbor pilot. Otherwise, this field is set to '0'.

CELL_CLASSIFIER_MAP: If CELL_CLASSIFIER_INCL is set to '1', this field is set as follows. Otherwise, this field is omitted. If the cell-specific ID is sequentially transmitted for each neighbor pilot included in this message, a bit for the corresponding pilot is set to '1'. Otherwise, the bit is set to '0'.

CELL_CLASSIFIER_LEN_ALL: If CELL_CLASSIFIER_INCL is set to '1', this field is set as follows. Otherwise, this field is omitted. If a cell classifier for every neighbor pilot included in this message is equal in length, this field is set to '1'. Otherwise, this field is set to '0'.

CELL_CLASSIFIER_LEN: If CELL_CLASSIFIER_INCL is set to '1', this field is set as follows. Otherwise, this field is omitted. If CELL_CLASSIFIER_LEN_ALL is set to '1', a cell-specific ID for every neighbor pilot is equal in length, and a value which is less by 1 than the value is set in bytes. If CELL_CLASSIFIER_LEN_ALL is set to '0', a length of cell classifier for the pilot for transmitting the cell-specific ID among the pilots included in this message is included in order of expression given in CELL_CLASSIFIER_MAP.

CELL_CLASSIFIER: CELL_CLASSIFIER_INCL is set to '1', this field is set as follows. Otherwise, this field is omitted. It is set such that a value of the cell classifier corresponding to the pilot set to '1' in CELL_CLASSIFIER_MAP has a value greater by 1 than a length set in CELL_CLASSIFIER_LEN.

Table 6 shows a format of a Neighbor List message after modification, and this message transmits a cell-specific ID for a neighbor cell to an access terminal in the idle/dormant state.

TABLE 6

| Field | Length (bits) |
|---|---|
| PILOT_PN | 9 |
| CONFIG_MSG_SEQ | 6 |
| PILOT_INC | 4 |
| Zero or more occurrences of the following record: | |
| { | |
| NGHBR_CONFIG | 3 |
| NGHBR_PN | 9 |
| CELL_CLASSIFIER_INCL | 1 |
| CELL_CLASSIFIER_LEN | 0 or 4 |
| CELL_CLASSIFIER | 0 or (CELL_CLASSIFIER + 1) × 8 |
| } | |

CELL_CLASSIFIER_INCL: If the message includes a specific ID for a corresponding pilot, CELL_CLASSIFIER_INCL is set to '1'. Otherwise, CELL_CLASSIFIER_INCL is set to '0'.

CELL_CLASSIFIER_LEN: If CELL_CLASSIFIER_INCL is set to '1', a value which is less by 1 than a value of the included cell classifier is set in bytes in this field. Otherwise, this field is omitted.

CELL_CLASSIFIER: If CELL_CLASSIFIER_INCL is set to '1', this field indicates a value of the included cell classifier. Otherwise, this field is omitted.

Table 7 shows a format of an Extended Neighbor List message after modification, and this message transmits a cell-specific ID for a neighbor cell to the access terminal in the idle/dormant state.

TABLE 7

| Field | Length (bits) |
|---|---|
| PILOT_PN | 9 |
| CONFIG_MSG_SEQ | 6 |
| PILOT_INC | 4 |

TABLE 7-continued

| Field | Length (bits) |
|---|---|
| Zero or more occurrences of the following record: | |
| { | |
| NGHBR_CONFIG | 3 |
| NGHBR_PN | 9 |
| SEARCH_PRIORITY | 2 |
| FREQ_INCL | 1 |
| NGBHR_BAND | 0 or 5 |
| NGHBR_FREQ | 0 or 11 |
| CELL_CLASSIFIER_INCL | 1 |
| CELL_CLASSIFIER_LEN | 0 or 4 |
| CELL_CLASSIFIER | 0 or (CELL_CLASSIFIER + 1) × 8 |
| } | |

CELL_CLASSIFIER_INCL: This field is set to '1', if the message includes a specific ID for a corresponding pilot. Otherwise, this field is set to '0'.

CELL_CLASSIFIER_LEN: If CELL_CLASSIFIER_INCL is set to '1', a value which is less by 1 than a length of the included cell classifier is set in bytes in this field. Otherwise, this field is omitted.

CELL_CLASSIFIER: If CELL_CLASSIFIER_INCL is set to '1', this field indicates a value of the included cell classifier. Otherwise, this field is omitted.

Table 8 shows a format of a General Neighbor List message after modification, and this message transmits a cell-specific ID for a neighbor cell to the access terminal in the idle/dormant state.

TABLE 8

| Field | Length (bits) |
|---|---|
| PILOT_PN | 9 |
| CONFIG_MSG_SEQ | 6 |
| PILOT_INC | 4 |
| NGBHR_SRCH_MODE | 2 |
| NGBHR_CONFIG_PN_INCL | 1 |
| FREQ_FIELDS_INCL | 1 |
| USE_TIMING | 1 |
| GLOBAL_TIMING_INCL | 0 or 1 |
| GLOBAL_TX_DURATION | 0 or 4 |
| GLOBAL_TX_PERIOD | 0 or 7 |
| NUM_NGBHR | 6 |
| . | |
| . | |
| . | |
| { (NUM_NGHBR) | |
| BCCH_SUPPORT | 0 or 1 |
| } (NUM_NGHBR) | |
| RESQ_ENABLED | 1 |
| RESQ_DELAY_TIME | 0 or 6 |
| RESQ_ALLOWED_TIME | 0 or 6 |
| RESQ_ATTEMPT_TIME | 0 or 6 |
| RESQ_CODE_CHAN | 0 or 11 |
| RESQ_QOF | 0 or 2 |
| RESQ_MIN_PERIOD_INCL | 0 or 1 |
| RESQ_MIN_PERIOD | 0 or 5 |
| RESQ_NUM_TOT_TRANS_INCL | 0 or 1 |
| RESQ_NUM_TOT_TRANS_20MS | 0 or 4 |
| RESQ_NUM_TOT_TRANS_5MS | 0 or 4 |
| RESQ_NUM_PREAMBLE_RC1_RC2 | 0 or 3 |
| RESQ_NUM_PREAMBLE | 0 or 3 |
| RESQ_POWER_DELTA | 0 or 3 |
| CELL_CLASSIFIER_INCL | 1 |
| CELL_CLASSIFIER_LEN | 0 or 4 |
| CELL_CLASSIFIER | 0 or (CELL_CLASSIFIER + 1) × 8 |

TABLE 8-continued

| Field | Length (bits) |
|---|---|
| If RESQ_ENABLED is set to '1', NUM_NGHBR occurrences of the following one-field record: | |
| { (NUM_NGHBR) | |
| NGHBR_RESQ_CONFIGURED | 1 |
| } (NUM_NGHBR) | |
| NUM_NGHBR occurrences of the following three fields: | |
| { (NUM_NGHBR) | |
| CELL_CLASSIFIER_INCL | 1 |
| CELL_CLASSIFIER_LEN | 0 or 4 |
| CELL_CLASSIFIER | 0 or (CELL_CLASSIFIER + 1) × 8 |
| } (NUM_NGHBR) | |

CELL_CLASSIFIER_INCL: If the message includes a specific ID for a corresponding pilot, this field is set to '1'. Otherwise, this field is set to '0'.

CELL_CLASSIFIER_LEN: If CELL_CLASSIFIER_INCL is set to '1', a value which is less by 1 than a length of the included cell classifier is set in bytes in this field. Otherwise, this field is omitted.

CELL_CLASSIFIER: If CELL_CLASSIFIER_INCL is set to '1', this field indicates a value of the included cell classifier. Otherwise, this field is omitted.

Table 9 shows a RADIO_INTERFACE_TYPE '00' (MC System) Radio Interface Type-specific field included in a Universal Neighbor List message and a Private Neighbor List message after modification, and this field transmits a cell-specific ID for a neighbor cell to the access terminal in the idle/dormant state.

TABLE 9

| Field | Length (bits) |
|---|---|
| PILOT_PN | 9 |
| CONFIG_MSG_SEQ | 6 |
| PILOT_INC | 4 |
| NGBHR_SRCH_MODE | 2 |
| NGHBR_CONFIG_PN_INCL | 1 |
| FREQ_FIELDS_INCL | 1 |
| USE_TIMING | 1 |
| GLOBAL_TIMING_INCL | 0 or 1 |
| GLOBAL_TX_DURATION | 0 or 4 |
| GLOBAL_TX_PERIOD | 0 or 7 |
| NUM_NGBHR | 6 |
| . | |
| . | |
| . | |
| NUM_NGHBR occurrences of the following one-field record if RESQ_ENABLED is set to '1': | |
| { (NUM_NGHBR) | |
| NGHBR_RESQ_CONFIGURED | 1 |
| } (NUM(NGHBR) | |
| {(NUM_NGHBR) | |
| NGHBR_PDCH_SUPPORTED | |
| } (NUM_NGHBR) | |
| NUM_NGHBR occurrences of the following three fields: | |
| { (NUM_NGHBR) | |
| CELL_CLASSIFIER_INCL | 1 |
| CELL_CLASSIFIER_LEN | 0 or 4 |
| CELL_CLASSIFIER | 0 or (CELL CLASSIFIER + 1) × 8 |
| } (NUM_NGHBR) | |
| RESERVED | 0-7 (as needed) |

CELL_CLASSIFIER_INCL: If the RADIO_INTERFACE_TYPE '00' (MC System) Radio Interface Type-specific field includes a specific ID for a corresponding pilot, this field is set to '1'. Otherwise, this field is set to '0'.

CELL_CLASSIFIER_LEN: If CELL_CLASSIFIER_INCL is set to '1', a value which is less by 1 than a length of the included cell classifier is set in bytes in this field. Otherwise, this field is omitted.

CELL_CLASSIFIER: If CELL_CLASSIFIER_INCL is set to '1', this field indicates a value of the included cell classifier. Otherwise, this field is omitted.

Table 10 shows a field added to the last part of an In-Traffic System Parameters message after modification.

TABLE 10

| Field | Length (bits) |
|---|---|
| CELL_CLASSLFIER_INCL | 1 |
| CELL_CLASSIFIER_LEN | 0 or 4 |
| CELL_CLASSIFIER | 0 or (CELL_CLASSIFIER_LEN + 1) × 8 |

CELL_CLASSIFIER_INCL: It indicates whether the message includes a cell-specific ID for supporting a differentiated service in the home cell, like in a user zone. CELL_CLASSIFIER_INCL is set to '1' when the corresponding cell transmits the cell-specific ID for supporting the service differentiated from that of other cells so that the access terminal receiving the cell-specific ID may include it in the message. Otherwise, CELL_CLASSIFIER_INCL is set to '0'.

CELL_CLASSIFIER_LEN: If CELL_CLASSIFIER_INCL is set to '1', it is set in bytes with a value which is less by 1 than a length of a cell classifier of the corresponding cell. Otherwise, CELL_CLASSIFIER_LEN is omitted.

CELL_CLASSIFIER: If CellClassifier is set to '1', it transmits a specific ID of the corresponding cell. Otherwise, CELL_CLASSIFIER is omitted. This value is for supporting the service specialized in the cell, and can be used for a virtual zone.

Table 11 shows a Neighbor List Update message after modification.

TABLE 11

| Field | Length (bits) |
|---|---|
| PILOT_INC | 4 |
| One or more occurrences of the following record: | |
| { | |
| NGHBR_PN | 9 |
| CELL_CLASSIFIER _INCL | 1 |
| CELL_CLASSIFIER_LEN | 0 or 4 |
| CELL_CLASSIFIER | 0 or (CELL_CLASSIFIER + 1) × 8 |
| } | |

CELL_CLASSIFIER_INCL: If the message includes a specific ID for a corresponding pilot, this field is set to '1'. Otherwise, this field is set to '0'.

CELL_CLASSIFIER_LEN: If CELL_CLASSIFIER_INCL is set to '1', a value which is less by 1 than a length of the included cell classifier is set in bytes in this field. Otherwise, this field is omitted.

CELL_CLASSIFIER: If CELL_CLASSIFIER_INCL is set to '1', this field indicates a value of the included cell classifier. Otherwise, this field is omitted.

Table 12 shows an Extended Neighbor List Update message after modification.

TABLE 12

| Field | Length (bits) |
|---|---|
| PILOT_INC | 4 |
| NGHBR_SRCH_MODE | 2 |
| SRCH_WIN_N | 4 |
| USE_TIMING | 1 |
| GLOBAL_TIMING_INCL | 0 or 1 |
| GLOBAL_TX_DURATION | 0 or 4 |
| GLOBAL_TX_PERIOD | 0 or 7 |
| NUM_NGBHR | 6 |
| . | |
| . | |
| . | |
| RESQ_ENAB LED | 1 |
| RESQ_DELAY_TIME | 0 or 6 |
| RESQ_ALLOWED_TIME | 0 or 6 |
| RESQ_ATTEMPT_TIME | 0 or 6 |
| RESQ_CODE_CHAN | 0 or 11 |
| RESQ_QOF | 0 or 2 |
| RESQ_MIN_PERIOD_INCL | 0 or 1 |
| RESQ_MIN_PERIOD | 0 or 5 |
| RESQ_NUM_TOT_TRANS_INCL | 0 or 1 |
| RESQ_NUM_TOT_TRANS_20MS | 0 or 4 |
| RESQ_NUM_TOT_TRANS_5MS | 0 or 4 |
| RESQ_NUM_PREAMBLE | 0 or 3 |
| RESQ_POWER_DELTA | 0 or 3 |
| If RESQ_ENABLED is set to '1', NUM_NGHBR occurrences of the following one-field record: | |
| { (NUM_NGHBR) | |
| NGHBR_RESQ_CONFIGURED | 1 |
| } (NUM_NGHBR) | |
| NUM_NGHBR occurrences of the following three fields: | |
| { (NUM_NGHBR) | |
| CELL_CLASSIFIER_INCL | 1 |
| CELL_CLASSIFIER_LEN | 0 or 4 |
| CELL_ CLASSIFIER | 0 or (CELL_CLASSIFIER + 1) × 8 |
| } (NUM_NGHBR) | |

CELL_CLASSIFIER_INCL: It indicates whether the message includes a cell-specific ID for supporting a differentiated service in the home cell, like in a user zone. CELL_CLASSIFIER_INCL is set to '1' when the corresponding cell transmits the cell-specific ID for supporting the service differentiated from that of other cells so that the access terminal receiving the cell-specific ID may include it in the message. Otherwise, CELL_CLASSIFIER_INCL is set to '0'.

CELL_CLASSIFIER_LEN: If CELL_CLASSIFIER_INCL is set to '1', it is set in bytes with a value which is less by 1 than a length of a cell classifier of the corresponding cell. Otherwise, CELL_CLASSIFIER_LEN is omitted.

CELL_CLASSIFIER: If CellClassifier is set to '1', it transmits a specific ID of the corresponding cell. Otherwise, CELL_CLASSIFIER is omitted. This value is for supporting the service specialized in the cell, and can be used for a virtual zone.

Next, Scheme 2 in the cdma2000 1xRTT access network will be described.

Scheme 2 is for facilitating cell configuration for supporting the differentiation and minimizing the over-the-air link overhead due to repeated information transmission, and defines messages and fields thereof.

Table 13 shows the fields added to the last parts of a System Parameters message, an ANSI-41 System Parameters message, and an MC-RR Parameters message, and a corresponding cell transmits its cell-specific ID to an access terminal in the idle/dormant state.

TABLE 13

| Field | Length (bits) |
| --- | --- |
| CELL_CLASSIFIER_INCL | 1 |
| CELL_CLASSIFIER_TYPE | 0 or 2 |
| CELL_CLASSIFIER_LEN | 0 or 4 |
| CELL_CLASSIFIER | 0 or (CELL_CLASSIFIER_LEN + 1) × 8 |

CELL_CLASSIFIER_INCL: It indicates whether the message includes a cell-specific ID for supporting a differentiated service in the home cell, like in a user zone. CELL_CLASSIFIER_INCL is set to '1' when the corresponding cell transmits the cell-specific ID for supporting the service differentiated from that of other cells so that the access terminal receiving the cell-specific ID may include it in the message. Otherwise, CELL_CLASSIFIER_INCL is set to '0'.

CELL_CLASSIFIER_TYPE: If CELL_CLASSIFIER_INCL is set to '1', this field is set as follows. Otherwise, this field is omitted. CELL_CLASSIFIER_TYPE is set to the same value for every cell in the corresponding access network.

Table 14 shows the CELL_CLASSIFIER_TYPE.

TABLE 14

| CELL_CLASSIFIER_TYPE (binary) | Description |
| --- | --- |
| 00 | BASE ID used for Cell Classifier |
| 01 | USER ZONE ID used for Cell Classifier |
| 10 | IDs other than BASE ID and USER ZONE ID used for Cell Classifier |
| 11 | Reserved |

00: Base Station Identification is used as a cell classifier.
01: User Zone Identification is used as a cell classifier.
10: A specific value except for BASE ID and USER ZONE ID is used as a cell classifier.

CELL_CLASSIFIER_LEN: If CELL_CLASSIFIER_INCL is set to '1' and CELL_CLASSIFIER_TYPE is not set to '00' or '01', this field is set in bytes with a value which is less by 1 than a length of a cell classifier of the corresponding cell. Otherwise, this field is omitted. CELL_CLASSIFIER_LEN is set to the same value for every cell in the corresponding access network.

CELL_CLASSIFIER: If CellClassifier is set to '1' and CELL_CLASSIFIER_TYPE is not set to '00' or '01', this field transmits a specific ID of a corresponding cell. Otherwise, this field is omitted. This value is for supporting the service specialized in the cell, and can be used for a virtual zone.

Table 15 shows a Base Station Status Response Information Record message after modification.

TABLE 15

| Field | Length (bits) |
| --- | --- |
| NUM_PILOTS | 4 |
| SID_NID_IND | 1 |
| NUM_PILOTS occurrences of the following record: | |
| { (NUM_PILOTS) | |
| RECORD_LEN | 4 |
| PILOT_PN | 9 |
| BASE_ID | 16 |
| SDI_NID_INCL | 0 or 1 |
| SID | 0 or 15 |
| NID | 0 or 16 |
| BASE_LAT_LONG_INCL | 1 |
| BASE_LAT | 0 or 22 |
| BASE_LONG | 0 or 23 |
| CELL_CLASSIFIER_INCL | 1 |
| CELL_CLASSIFIER_MAP | 0 or NUM_PILOTS |
| Zero or N occurrences of the following field: | |
| CELL_CLASSIFIER | 0 or (CELL_CLASSIFIER + 1) × 8 |
| RESERVED_1 | 0-7 (as required) |
| } (NUM_PILOTS) | |

CELL_CLASSIFIER_INCL: If the message includes cell classifier information for each neighbor pilot, this field is set to '1'. Otherwise, this field is set to '0'.

CELL_CLASSIFIER_MAP: If CELL_CLASSIFIER_INCL is set to '1', this field is set as follows. Otherwise, this field is omitted. If the cell-specific ID is sequentially transmitted for each neighbor pilot included in this message, a bit for the corresponding pilot is set to '1'. Otherwise, the bit is set to '0'.

CELL_CLASSIFIER: If CELL_CLASSIFIER_INCL is set to '1', this field is set as follows. Otherwise, this field is omitted. This field indicates a value of the cell classifier corresponding to the pilot set to '1' in CELL_CLASSIFIER_MAP.

Table 16 shows a format of a Neighbor List message after modification, and this message transmits a cell-specific ID for a neighbor cell to the access terminal in the idle/dormant state.

TABLE 16

| Field | Length (bits) |
| --- | --- |
| PILOT_PN | 9 |
| CONFIG_MSG_SEQ | 6 |
| PILOT_INC | 4 |
| Zero or more occurrences of the following record: | |
| { | |
| NGHBR_CONFIG | 3 |
| NGHBR_PN | 9 |
| } | |
| CELL_CLASSIFIER_INCL | 1 |

TABLE 16-continued

| Field | Length (bits) |
|---|---|
| CELL_CLASSIFIER_MAP | 0 or N |
| Zero or N occurrences of the following fields: | |
| { | |
| CELL_CLASSIFIER | 0 or (CELL CLASSIFIER + 1) × 8 |
| } | |

CELL_CLASSIFIER_INCL: If the message includes a specific ID for a corresponding pilot and CELL_CLASSIFIER_TYPE defined in a System Parameters message is set to a value other than '00' and '01', this field is set to '1'. Otherwise, this field is set to '0'.

CELL_CLASSIFIER_MAP: If CELL_CLASSIFIER_INCL is set to '1', this field is set as follows. Otherwise, this field is omitted. If this field transmits a specific ID for each neighbor pilot included in this message, the corresponding bit is set to '1'. Otherwise, the corresponding bit is set to '0'.

CELL_CLASSIFIER: If CELL_CLASSIFIER_INCL is set to '1', this field indicates a specific ID corresponding to a neighbor pilot where a bit of CELL_CLASSIFIER_MAP is set to '1'. Otherwise, this field is omitted.

Table 17 shows a format of an Extended Neighbor List message after modification, and this message transmits a cell-specific ID for a neighbor cell to the access terminal in the idle/dormant state.

TABLE 17

| Field | Length (bits) |
|---|---|
| PILOT_PN | 9 |
| CONFIG_MSG_SEQ | 6 |
| PILOT_INC | 4 |
| Zero or more occurrences of the following record: | |
| { | |
| NGHBR_CONFIG | 3 |
| NGHBR_PN | 9 |
| SEARCH_PRIORITY | 2 |
| FREQ_INCL | 1 |
| NGBHR_BAND | 0 or 5 |
| NGHBR_FREQ | 0 or 11 |
| } | |
| CELL_CLASSIFIER_INCL | 1 |
| CELL_CLASSIFIER_MAP | 0 or N |
| Zero or N occurrences of the following fields: | |
| { | |
| CELL_CLASSIFIER | 0 or (CELL CLASSIFIER + 1) × 8 |
| } | |

CELL_CLASSIFIER_INCL: If the message includes a specific ID for a corresponding pilot and CELL_CLASSIFIER_TYPE defined in a System Parameters message is set to a value other than '00' and '01', this field is set to '1'. Otherwise, this field is set to '0'.

CELL_CLASSIFIER_MAP: If CELL_CLASSIFIER_INCL is set to '1', this field is set as follows. Otherwise, this field is omitted. If this field transmits a specific ID for each neighbor pilot included in this message, the corresponding bit is set to '1'. Otherwise, the corresponding bit is set to '0'.

CELL_CLASSIFIER: If CELL_CLASSIFIER_INCL is set to '1', this field indicates a specific ID corresponding to a neighbor pilot where a bit of CELL_CLASSIFIER_MAP is set to '1'. Otherwise, this field is omitted.

Table 18 shows a format of a General Neighbor List message after modification, and this message transmits a cell-specific ID for a neighbor cell to the access terminal in the idle/dormant state.

TABLE 18

| Field | Length (bits) |
|---|---|
| PILOT_PN | 9 |
| CONFIG_MSG_SEQ | 6 |
| PILOT_INC | 4 |
| NGBHR_SRCH_MODE | 2 |
| NGBHR_CONFIG_PN_INCL | 1 |
| FREQ_FIELDS_INCL | 1 |
| USE_TIMING | 1 |
| GLOBAL_TIMING_INCL | 0 or 1 |
| GLOBAL_TX_DURATION | 0 or 4 |
| GLOBAL_TX_PERIOD | 0 or 7 |
| NUM_NGBHR | 6 |
| . | |
| . | |
| { (NUM_NGBHR) | |
| BCCH_SUPPORT | 0 or 1 |
| } (NUM_NGHBR) | |
| RESQ_ENABLED | 1 |
| RESQ_DELAY_TIME | 0 or 6 |
| RESQ_ALLOWED_TIME | 0 or 6 |
| RESQ_ATTEMPT_TIME | 0 or 6 |
| RESQ_CODE_CHAN | 0 or 11 |
| RESQ_QOF | 0 or 2 |
| RESQ_MIN_PERIOD_INCL | 0 or 1 |
| RESQ_MIN_PERIOD | 0 or 5 |
| RESQ_NUM_TOT_TRANS_INCL | 0 or 1 |
| RESQ_NUM_TOT_TRANS_20MS | 0 or 4 |
| RESQ_NUM_TOT_TRANS_5MS | 0 or 4 |
| RESQ_NUM_PREAMBLE_RC1_RC2 | 0 or 3 |
| RESQ_NUM_PREAMBLE | 0 or 3 |
| RESQ_POWER_DELTA | 0 or 3 |
| CELL_CLASSIFIER_INCL | 1 |
| CELL_CLASSIFIER_LEN | 0 or 4 |
| CELL_CLASSIFIER | 0 or (CELL_CLASSIFIER + 1) × 8 |
| If RESQ_ENABLED is set to '1', NUM_NGHBR occurrences of the following one-field record: | |
| { (NUM_NGHBR) | |
| NGHBR_RESQ_CONFIGURED | 1 |
| } (NUM_NGHBR) | |
| CELL_CLASSIFIER_INCL | 1 |
| CELL_CLASSIFIER_MAP | 0 or N |
| Zero or N occurrences of the following fields: | |
| { | |
| CELL_CLASSIFIER | 0 or (CELL_CLASSIFIER + 1) × 8 |
| } | |

CELL_CLASSIFIER_INCL: If the message includes a specific ID for a corresponding pilot and CELL_CLASSIFIER_TYPE defined in a System Parameters message is set to a value other than '00' and '01', this field is set to '1'. Otherwise, this field is set to '0'.

CELL_CLASSIFIER_MAP: If CELL_CLASSIFIER_INCL is set to '1', this field is set as follows. Otherwise, this field is omitted. If this field transmits a specific ID for each neighbor pilot included in this message, the corresponding bit is set to '1'. Otherwise, the corresponding bit is set to '0'.

CELL_CLASSIFIER: If CELL_CLASSIFIER_INCL is set to '1', this field indicates a specific ID corresponding to a neighbor pilot where a bit of CELL_CLASSIFIER_MAP is set to '1'. Otherwise, this field is omitted.

Table 19 shows a RADIO_INTERFACE_TYPE '00' (MC System) Radio Interface Type-specific field included in a Universal Neighbor List message and a Private Neighbor List message after modification, and this field transmits a cell-specific ID for a neighbor cell to the access terminal in the idle/dormant state.

TABLE 19

| Field | Length (bits) |
|---|---|
| PILOT_PN | 9 |
| CONFIG_MSG_SEQ | 6 |

TABLE 19-continued

| Field | Length (bits) |
|---|---|
| PILOT_INC | 4 |
| NGBHR_SRCH_MODE | 2 |
| NGBHR_CONFIG_PN_INCL | 1 |
| FREQ_FIELDS_INCL | 1 |
| USE_TIMING | 1 |
| GLOBAL_TIMING_INCL | 0 or 1 |
| GLOBAL_TX_DURATION | 0 or 4 |
| GLOBAL_TX_PERIOD | 0 or 7 |
| NUM_NGBHR | 6 |
| . | |
| . | |
| NUM_NGHBR occurrences of the following one-field record if RESQ_ENABLED is set to '1': { (NUM_NGHBR) NGHBR_RESQ_CONFIGURED } (NUM(NGHBR)) { (NUM_NGHBR) NGHBR_PDCH_SUPPORTED } (NUM_NGHBR) | 1 |
| CELL_CLASSIFIER_INCL | 1 |
| CELL_CLASSIFIER_MAP | 0 or N |
| Zero or N occurrences of the following fields: { | |
| CELL CLASSIFIER } | 0 or (CELL_CLASSIFIER + 1) × 8 |
| RESERVED | 0-7 (as needed) |

CELL_CLASSIFIER_INCL: If the RADIO_INTERFACE_TYPE '00' (MC System) Radio Interface Type-specific field includes a specific ID for a corresponding pilot, this field is set to '1'. Otherwise, this field is set to '0'.

CELL_CLASSIFIER_LEN: If CELL_CLASSIFIER_INCL is set to '1', a value which is less by 1 than a length of the included cell classifier is set in bytes in this field. Otherwise, this field is omitted.

CELL_CLASSIFIER: If CELL_CLASSIFIER_INCL is set to '1', this field indicates a value of the included cell classifier. Otherwise, this field is omitted.

Table 20 shows a field added to the last part of an In-Traffic System Parameters message after modification.

TABLE 20

| Field | Length (bits) |
|---|---|
| CELL_CLASSIFIER_INCL | 1 |
| CELL_CLASSIFIER_TYPE | 0 or 2 |
| CELL_CLASSIFIER_LEN | 0 or 4 |
| CELL_CLASSIFIER | 0 or (CELL_CLASSIFIER_LEN + 1) × 8 |

CELL_CLASSIFIER_INCL: It indicates whether the message includes a cell-specific ID for supporting a differentiated service in the home cell, like in a user zone. CELL_CLASSIFIER_INCL is set to '1' when the corresponding cell transmits the cell-specific ID for supporting the service differentiated from that of other cells so that the access terminal receiving the cell-specific ID may include it in the message. Otherwise, CELL_CLASSIFIER_INCL is set to '0'.

CELL_CLASSIFIER_TYPE: If CELL_CLASSIFIER_INCL is set to '1', this field is set as follows. Otherwise, this field is omitted. CELL_CLASSIFIER TYPE is set to the same value for every cell in the corresponding access network.

Table 21 shows the CELL_CLASSIFIER_TYPE.

TABLE 21

| CELL_CLASSIFIER_TYPE (binary) | Description |
|---|---|
| 00 | BASE ID used for Cell Classifier |
| 01 | USER ZONE ID used for Cell Classifier |
| 10 | IDs other than BASE ID and USER ZONE ID used for Cell Classifier |
| 11 | Reserved |

00: Base Station Identification is used as a cell classifier.
01: User Zone Identification is used as a cell classifier.
10: A specific value except for BASE ID and USER ZONE ID is used as a cell classifier.

CELL_CLASSIFIER_LEN: If CELL_CLASSIFIER_INCL is set to '1' and CELL_CLASSIFIER_TYPE is not set to '00' or '01', this field is set in bytes with a value which is less by 1 than a length of a cell classifier of the corresponding cell. Otherwise, this field is omitted. CELL_CLASSIFIER_LEN is set to the same value for every cell in the corresponding access network.

CELL_CLASSIFIER: If CellClassifier is set to '1' and CELL_CLASSIFIER_TYPE is not set to '00' or '01', this field transmits a specific ID of a corresponding cell. Otherwise, this field is omitted. This value is for supporting the service specialized in the cell, and can be used for a virtual zone.

Table 22 shows a Neighbor List Update message after modification.

TABLE 22

| Field | Length (bits) |
|---|---|
| PILOT_INC | 4 |
| One or more occurrences of the following record: { | |
| NGHBR_PN } | 9 |
| CELL_CLASSIFIER_INCL | 1 |
| CELL_CLASSIFIER_MAP | 0 or N |
| Zero or N occurrences of the following fields: { | |
| CELL_CLASSIFIER } | 0 or (CELL_CLASSIFIER + 1) × 8 |

CELL_CLASSIFIER_INCL: If the message includes a specific ID for a corresponding pilot and CELL_CLASSIFIER_TYPE defined in a System Parameters message is set to a value other than '00' and '01', this field is set to '1'. Otherwise, this field is set to '0'.

CELL_CLASSIFIER_MAP: If CELL_CLASSIFIER_INCL is set to '1', this field is set as follows. Otherwise, this field is omitted. If this field transmits a specific ID for each neighbor pilot included in this message, the corresponding bit is set to '1'. Otherwise, the corresponding bit is set to '0'.

CELL_CLASSIFIER: If CELL_CLASSIFIER_INCL is set to '1', this field indicates a specific ID corresponding to a neighbor pilot where a bit of CELL_CLASSIFIER_MAP is set to '1'. Otherwise, this field is omitted.

Table 23 shows an Extended Neighbor List Update message after modification.

TABLE 23

| Field | Length (bits) |
|---|---|
| PILOT_INC | 4 |
| NGHBR_SRCH_MODE | 2 |
| SRCH_WIN_N | 4 |
| USE_TIMING | 1 |

TABLE 23-continued

| Field | Length (bits) |
|---|---|
| GLOBAL_TIMING_INCL | 0 or 1 |
| GLOBAL_TX_DURATION | 0 or 4 |
| GLOBAL_TX_PERIOD | 0 or 7 |
| NUM_NGBHR | 6 |
| . | |
| . | |
| . | |
| RESQ_ENABLED | 1 |
| RESQ_DELAY_TIME | 0 or 6 |
| RESQ_ALLOWED_TIME | 0 or 6 |
| RESQ_ATTEMPT_TIME | 0 or 6 |
| RESQ_CODE_CHAN | 0 or 11 |
| RESQ_QOF | 0 or 2 |
| RESQ_MIN_PERIOD_INCL | 0 or 1 |
| RE SQ_MIN_PERIOD | 0 or 5 |
| RE SQ_NUM_TOT_TRANS_INCL | 0 or 1 |
| RE SQ_NUM_TOT_TRANS_20MS | 0 or 4 |
| RESQ_NUM_TOT_TRANS_5MS | 0 or 4 |
| RESQ_NUM_PREAMBLE | 0 or 3 |
| RESQ_POWER_DELTA | 0 or 3 |
| If RESQ_ENABLED is set to '1', NUM_NGHBR occurrences of the following one-field record: | |
| { (NUM_NGHBR) | |
| NGHBR_RESQ_CONFIGURED | 1 |
| } (NUM_NGHBR) | |
| CELL_CLASSIFIER_INCL | 1 |
| CELL_CLASSIFIER_MAP | 0 or N |
| Zero or N occurrences of the following fields: | |
| { | |
| CELL_CLASSIFIER | 0 or (CELL_CLASSIFIER + 1) × 8 |
| } | |

CELL_CLASSIFIER_INCL: If the message includes a specific ID for a corresponding pilot and CELL_CLASSIFIER_TYPE defined in a System Parameters message is set to a value other than '00' and '01', this field is set to 1'. Otherwise, this field is set to '0'.

CELL_CLASSIFIER_MAP: If CELL_CLASSIFIER_INCL is set to '1', this field is set as follows. Otherwise, this field is omitted. If this field transmits a specific ID for each neighbor pilot included in this message, the corresponding bit is set to 1'. Otherwise, the corresponding bit is set to '0'.

CELL_CLASSIFIER: If CELL_CLASSIFIER_INCL is set to '1', this field indicates a specific ID corresponding to a neighbor pilot where a bit of CELL_CLASSIFIER_MAP is set to '1'. Otherwise, this field is omitted.

Next, a description will be made of examples to which the above proposed scheme can be applied where the new-type home cell, which is a subscriber's home solution, is added to the existing public network in the cdma2000 1xEV-DO access network. Such examples are premised on the network configuration including an Access Terminal (AT), a Base Transceiver System (BTS), an Access Network Controller (ANC), a Packet Control Function (PCF), a Packet Data Serving Node (PDSN), an Access Network-Authorization/Authentication/Accounting (AN-AAA), an Authorization/Authentication/Accounting (AAA), and a Session Control-Mobility Management (SC-MM), all of which are network elements of the existing network, together with a home cell in the form of a low-capacity BTS.

Herein, the home cell is called a Low Cost internet BTS (LCiB), and has a cell type capable of providing all voice and data services including Voice over Internet Protocol (VoIP) service with the low-cost, low-capacity BTS having an IP platform.

An operation in the network is roughly divided into 4 operations: (1) a provisioning operation of providing/setting configuration and parameters that should be supported at initial operation or during operation in a home cell and an access terminal or other network elements to provide a differentiated service to the user in the home cell, (2) a cell selection and location registration operation including call permission control for distinguishing the home cell that provides the differentiated service, from the public cell that does not provide the differentiated service, (3) an operation for a differentiated accounting function, one of the differentiated services, of applying an accounting rate different from that in the public cell, and (4) a dormant/active seamless handoff operation between the public cell and the home cell with the differentiated accounting being supported. Each of the operations will be described in detail hereinbelow.

Service Provisioning Scenario

There is a need for the information used for determining whether to support the general service for other users as well as the user supporting a differentiated service of the home cell. The information is needed in order to provide the differentiated service in the service coverage for the subscriber that is designated by an owner or manager of the home cell. For the unregistered subscribers, there is a need to determine whether to provide the general service. For the subscribers defined to provide the differentiated service, there is a need for the information on the corresponding subscribers. The subscriber information should be information that is specific to the subscribers. An exemplary embodiment of the present invention uses an International Mobile Station Identity (IMSI) specific to access terminals or a Network Access Identifier (NAI) specific to subscribers. In addition, an access terminal used by a user or a subscriber should be able to determine the possibility of receiving the differentiated service in the home cell distinguished from the public cell using the information on the home cell from which it can receive the differentiated service. Further, the access terminal should notify the determination to the network, or request the differentiated service. To this end, it is defined that the access terminal has a sector ID which is information specific to the home cell, or a similar cell-specific value. Operations of the access terminal and the cell differ according to the scheme, and a description thereof will be made below. In addition thereto, there is a need for a pilot PN offset for the corresponding home cell. The access terminal compares the sector ID and pilot PN values, and determines the corresponding cell as its home cell in which it is registered, if both values are satisfied. Optionally, additional home cell-specific information is included on the latitude and longitude of the position where the home cell is located.

Cell Selection, Location Registration and Home Cell-Level Call Permission Control In order to improve user convenience while providing a service of the home cell differentiated from that of the public cell, the access terminal should change its pilot set management method, or should be able to deliver additional information while using the intact pilot set management method.

First, the scheme of changing the pilot set management method will be described. The method of performing pilot management for handoff while supporting the differentiated accounting between the public cell and the home cell of the access terminal in the active state is equal to the conventional one. However, for handoff in the dormant state, origination of service from the subscriber, and termination of service to the user, the access terminal should change an active pilot set and candidate pilot set management methods in the idle state, for the differentiation through the home cell. According to the current pilot set management method, the access terminal manages one active pilot and a plurality of candidate pilots in the idle state, and changes the cell that it is monitoring by changing the active pilot, if strength of the candidate pilot is higher than strength of the active pilot. In the case where public cells and home cells coexist and the home cell provides a service differentiated from that of the public cell, in order for the access terminal to determine whether a corresponding cell is the home cell in which it is registered as a user capable of receiving the differentiated service, for the active pilot set and the candidate pilot set managed by the access terminal itself, the access terminal receives an overhead message from the corresponding cells even for a set of the candidate pilots not belonging to the active pilot to acquire the system information. The access terminal compares the received overhead message with the parameters defined in the foregoing provisioning to determine whether the corresponding cell is the home cell in which it is registered to be able to receive the differentiated service. Because this operation means that there is a plurality of active pilots managed by the access terminal in the idle state, the access terminal determines pilots of its home cell in the active pilot set and the candidate pilot set, and monitors the strongest pilot among them to register its own location. In this manner, it is possible to provide the differentiated service through the home cell not only for origination of service but also for termination of service. If the home cell receives an originating service request from an unregistered access terminal or receives a page from an upper layer for a terminating service, the home cell can provide the general service for the corresponding subscriber or deny the service request according to a predetermined condition.

Second, in the scheme of using the intact pilot set management method, each home cell additionally transmits its specific information to the access terminal along with the neighbor information. In an exemplary embodiment of the present invention, the home cell additionally transmits information in neighbor cells along with a SectorParameters message, and adds its specific ID to a QuickConfig message. A description will now be made of the message formats before and after modification, and additionally defined fields.

Table 24 shows a QuickConfig message after modification, and this message transmits a cell-specific ID to the access terminal.

TABLE 24

| Field | Length (bits) |
| --- | --- |
| MessageID | 8 |
| ColorCode | 8 |
| SectorID24 | 24 |
| SectorSignature | 16 |
| AccessSignature | 16 |
| Redirect | 1 |
| RPCCount63To0 | 6 |
| RPCCount63To0 occurrences of the following field: | |
| ForwardTrafficValid63To0 | 1 |
| RPCCount127To64Included | 0 or 1 |
| RPCCount127to64 | 0 or 6 |
| RPC127To64 occurrences of the following field: | |
| ForwardTrafficValid127To64 | 0 or 1 |
| CellClassifierIncluded | 0 or 1 |
| CellClassigierLength | 8 |
| CellClassifier | 0 or (CellClassifierLength + 1) × 8 |
| Reserved | 0-7 (as needed) |

CellClassifierIncluded: It indicates whether the message includes a cell-specific ID for supporting a differentiated service in the home cell, like in a user zone. This field is set to '1' when the corresponding cell transmits the cell-specific ID for supporting the service differentiated from that of other cells so that the access terminal receiving the cell-specific ID may include it in the message. Otherwise, this field is set to '0'.

CellClassifierLength: It is expressed in bytes with a value which is less by 1 than a length of CellClassifier.

CellClassifier: If CellClassifier is set to '1', the message includes this field and transmits a cell-specific ID. This value is for supporting the service specialized in the cell, and can be used for a virtual zone.

Table 25 shows a SectorParameters message after modification, and this message transmits a specific ID of a neighbor cell to the access terminal.

TABLE 25

| Field | Length (bit) |
| --- | --- |
| MessageID | 8 |
| CountryCode | 8 |
| SectorID | 128 |
| SubnetMask | 8 |
| SectorSignature | 16 |
| Latitude | 22 |
| Longitude | 23 |
| RouteUpdateRadius | 11 |
| LeapSeconds | 8 |
| LocalTimeOffset | 11 |
| ReverseLinkSilenceDuration | 2 |
| ReverseLinkSilencePeriod | 2 |
| ChannelCount | 5 |
| ChannelCount occurrences of the following field: | |
| Channel | 24 |
| NeighborCount | 5 |
| NeighborCount occurrences of the following field: | |
| NeighborPilotPN | 9 |
| NeighborCount occurrences of the following two fields: | |
| NeighborChannelIncluded | 1 |
| NeighborChannel | 0 or 24 |
| NeighborSearchWindowSizeIncluded | 1 |
| NeighborCount occurrences of the following field: | |
| NeighborSearchWindowSize | 0 or 4 |
| NeighborSearchWindowOffsetIncluded | 1 |
| NeighborCount occurrences of the following field: | |
| NeighborSearchWindowOffset | 0 or 3 |
| RouteUpdateTriggerCodeIncluded | 0 or 1 |
| RouteUpdateTriggerCode | 0 or 12 |
| RouteUpdateTriggerMaxAge | 0 or 4 |
| FPDCHSupportIncluded | 0 or 1 |
| m, 0 <= m <= Count occurrences of the following field: | |
| FPDCHSupported | 0 or 1 |
| CellClassiferMap | NeighborCount |
| CellClassifierLengthAll | 1 |
| One or NeighborCount occurrences of the following field: | |
| CellClassifierLength | 8 |
| NeighborCount occurrences of the following field: | |
| CellClassifier | (CellClassifierLength + 1) × 8 |
| Reserved | 0-7 (as needed) |

CellClassifierMap: It indicates whether the message includes a cell classifier for each neighbor pilot included in the message. This field is set to '1' if the cell classifier is included in bits from the included first pilot to last pilot. Otherwise, this field is set to '0'.

CellClassifierLengthAll: If all neighbor pilots included in this message are equal in length of CellClassifier, this field is set to '1'. Otherwise, this field is set to '0'.

CellClassifierLength: If CellClassifierLength is set to '1', the number of this fields included in the message is one. It is expressed in bytes with a value which is less by 1 than a length in common to every CellClassifier.

CellClassifier: It is set as a cell-specific ID for a neighbor pilot. This value is for supporting the service specialized in the cell, and can be used for a virtual zone.

Differentiated Accounting

There are two proposed schemes for supporting the differentiated accounting. Each scheme can determine a method of supporting the differentiated accounting taking into account the request of a service provider, the standard compatibility, and the implementation facility. Of the two proposed schemes, a first scheme could add convenience and authority to the user. However, the first scheme is inferior to a second scheme in terms of network management. On the contrary, the second scheme has many operational advantages, but it is inferior to the first scheme in terms of providing convenience and authority to the user. In the first scheme, a home cell's owner determines an accounting rate for its subscribers, and this scheme can allow the owner to determine various accounting rates as long as the criteria determined by the network operator is disobeyed. After rate/tariff information for each user registered in the home cell is set to an appropriate value, if there is a service request for a corresponding registered subscriber, accounting data can be generated by delivering rate/tariff information for the subscriber to the upper layer's network elements. Further, accounting data can be generated that is appropriate for the corresponding subscriber, depending on the rate/tariff information, and can be delivered to an accounting center. In this case, an information element for delivering the rate/tariff information from the home cell, and a vendor specific attribute should be newly defined and added in the interface between the home cell, ANC, PCF and PDSN. The second scheme adds the accounting rate in the corresponding home cell to a subscriber profile of an AAA together with information on the home cell in which the corresponding subscriber is registered, and provides differentiated accounting depending on the subscriber profile when processing the accounting data record from the PDSN. This scheme can efficiently support the differentiated accounting by simply adding a small amount of information to the subscriber profile, without requesting a modification in the network elements. In this scheme, the home cell's owner cannot personally determine the accounting rate of its subscribers, and can have an accounting authority through an operator or the third party concerned.

Seamless Handoff Performed between Public Cell and Home Cell with Differentiation Supported The scheme of supporting active handoff between a public cell and a home cell can differ according to a type of the home cell and an A8/A10 access management method between ANC, PCF and PDSN. The home cell can also have the functions of the ANC, PCF and PDSN in addition to the function of the BTS. In this case, the flowchart and operation between the network elements shown below can be replaced by an operation in the home cell, and depends on home cell realization. FIGS. 4A to 8 correspond to inbound/outbound active handoff based on the home cell having only the function of the BTS for each individual area to which the access terminal moves. The shown handoffs are based on home-cell-inbound handoff, and the inbound and outbound handoffs slightly differ in the parameters exchanged between the public cell and the home cell for the accounting purpose, and in their operational methods, and the related contents will be described with reference to FIGS. 4A to 8. The call permission control based on the information on the user registered in the home cell is also applied in the same way to the handoff.

Figure 4A:
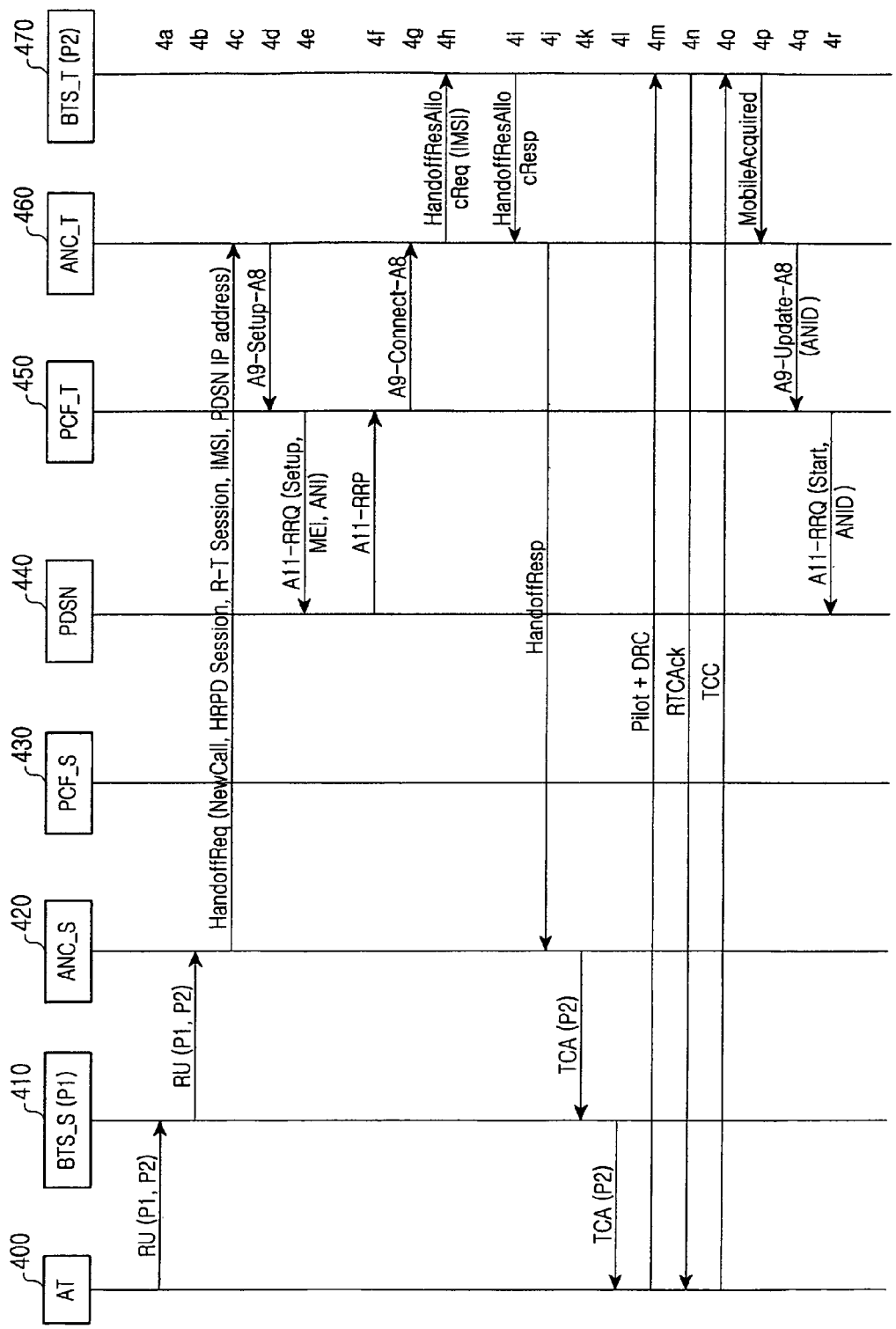
FIGS. 4A and 4B are call flow diagrams illustrating an inter-PCF handoff operation according to an exemplary embodiment of the present invention.
Figure 4B:
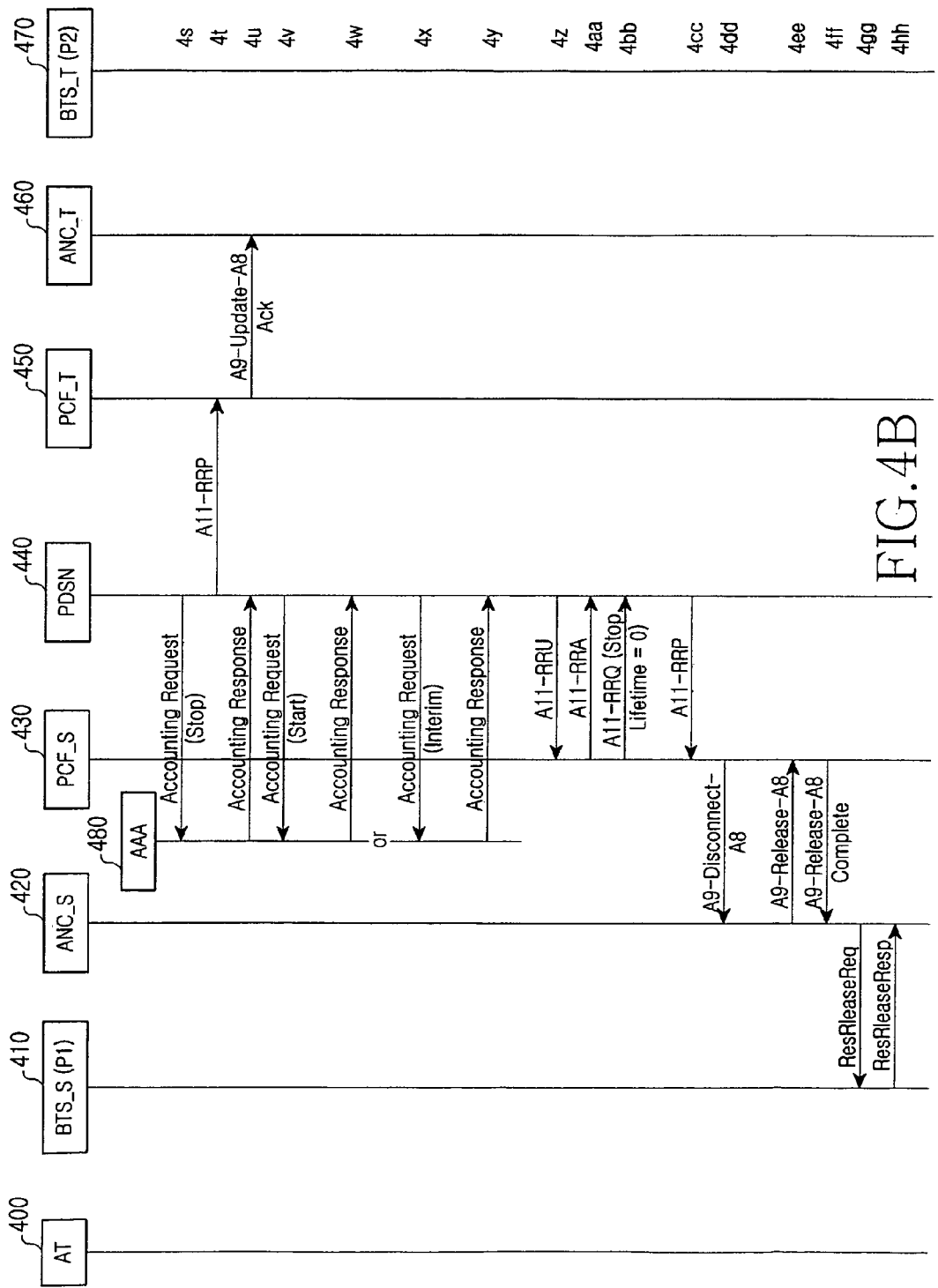

FIGS. 4A and 4B are call flow diagrams illustrating an inter-PCF handoff operation according to an exemplary embodiment of the present invention. The inter-PCF handoff is a serving R-P session release handoff initiated by a PDSN, wherein as an access terminal moves between PCF areas, the PDSN initiates R-P session release between the PDSN and a serving PCF. In an exemplary embodiment of the present invention, it is assumed that an R-P session has only one R-P connection. However, if the R-P session has a plurality of R-P connections, only the corresponding R-P connection is released.

Referring to FIGS. 4A and 4B, in step 4a, if there is a condition that an access terminal (AT) 400 defining a pilot P1 as a serving cell adds a target pilot P2 from a home cell to a pilot set, manages the pilot set, and transmits a RouteUpdate message for handoff, the AT 400 transmits a RouteUpdate (RU) message including P1 and P2 information to a serving cell (BTS_S) 410.

In step 4b, upon receipt of the RouteUpdate message from the AT 400, the BTS_S 410 transmits the received RouteUpdate message to a serving ANC (ANC_S) 420, for a handoff process.

In step 4c, upon receipt of the RouteUpdate message from the BTS_S 410, the ANC_S 420 transmits a HandoffReq message for the handoff process to a target ANC (ANC_T) 460, determining that the pilot P2 is a home cell belonging to the ANC_T 460 by parsing the pilot information included in the received RouteUpdate message. Because an accounting rate in a public cell may differ from an accounting rate in a home cell, the included information includes a NewCall indicator for enabling generation of a new accounting session from a target PCF to a PDSN, a High Rate Packet Data (HRPD) session of an AT, R-T session information, and AT information (IMSI) used for performing call permission in response to a handoff request from a target cell. Further, a PSDN IP address may be included.

In step 4d, upon receipt of the handoff request from the ANC_S 420, the ANC_T 460 transmits an A9-Setup-A8 message used for setting up a new A8 connection with a PCF_T 450.

In step 4e, upon receipt of the A9-Setup-A8 message from the ANC_T 460, the PCF_T 450 transmits an A11-Registration Request (RRQ) message used for setting up a new A10 connection with a PDSN 440. The A11-Registration Request message includes an Access Network Identifier (ANI) and a Mobility Indicator (MEI) of an AT needed by the PDSN 440 for generating an accounting data record. Further, setup information may be included.

In step 4f, the PDSN 440 transmits an A11-Registration Reply (RRP) to the PCF_T 450 in response to the received A11-Registration Request.

In step 4g, after the success in setting up the A10 connection, the PCF_T 450 transmits a response to the A8 connection setup request to the ANC_T 460 in an A9-Connect-A8 message.

In step 4h, after the success in performing A8/A10 connection setup to the upper layer, the ANC_T 460 sends a resource allocation request for handoff to the target cell via a HandoffResAllocReq message. The resource allocation request includes AT information (IMSI) used for performing call permission in the target cell. Steps 4d to 4h may be performed in parallel, and may change in order according to an implementation scheme.

In step 4i, upon receipt of the resource allocation request, a home cell (BTS_T) 470 performs resource allocation, and then notifies the corresponding result to the ANC_T 460 via a HandoffResAllocResp message.

In step 4j, after the success in resource allocation and connection setup for handoff, the ANC_T 460 notifies the corresponding result to the ANC_S 420 via a HandoffResp message, informing of the preparation for the handoff.

In step 4k, upon receipt of the information indicating the preparation for the handoff from the ANC_T 460, the ANC_S 420 transmits to the BTS_S 410 a TrafficChannelAssignment (TCA) message generated to include the corresponding information targeting the AT 400. The TrafficChannelAssignment message includes resource information for the target pilot P2.

In step 4*l*, the BTS_S 410 transmits the TrafficChannelAssignment message received from the ANC_S 420 to the AT 400.

In step 4*m*, upon receipt of the TrafficChannelAssignment message transmitted from the BTS_S 410, the AT 400 handles the received message and transmits a pilot channel and a DRC channel for the pilot P2.

In step 4*n*, upon receipt of the pilot and the DRC from the AT 400, the BTS_T 470 notifies of the success in uplink acquisition to the AT 400 using an RTCAck message.

In step 4*o*, after detecting the success in uplink acquisition, the AT 400 notifies of the success in handoff by transmitting a TrafficChannelComplete (TCC) message to the BTS_T 470.

In step 4*p*, upon receipt of the TrafficChannelAssignment message from the AT 400, the BTS_T 470 notifies of the success in handoff of the AT 400 to the ANC_T 460 using a MobileAcquired message. This procedure may be performed immediately after the BTS_T 470 receives the pilot and the DRC from the AT 400.

In step 4*q*, after detecting the successful completion of handoff of the AT 400, the ANC_T 460 notifies the corresponding result to the PCF_T 450 using an A9-Update-A8 message for an accounting start in the home cell for the corresponding AT. The A9-Update-A8 message may also include an Access Network Identifier (ANID) for the home cell. The differentiated accounting may start in steps 4*d* and 4*e* when the handoff starts. In this case, an Airlink record type transmitted to the PDSN 440 in step 4*e* includes a start record as well as a setup record.

In step 4*r*, upon receipt of the A9-Update-A8 message notifying the accounting start from the PCF_T 460, the PCF_T 450 sends a request for stopping the old accounting session using an A11-Registration Request message to notify start of an accounting session based on a new accounting rate to PSDN 440.

In step 4*s*, upon receipt of the new accounting session start request from the PCF_T 450, the PDSN 440 sends a request for stopping the old accounting session to the AAA 480.

In step 4*t*, the PDSN 440 transmits an A11-Registration Reply to the PCF_T 450 in response to the accounting session start request from the PCF_T 450.

In step 4*u*, upon receipt of the stop request for the old accounting session from the PDSN 440, the AAA 480 transmits the corresponding result to the PDSN 440 using an Accounting Response message. Upon receipt of a response to the new accounting session start request from the PDSN 440, the PCF_T 450 responds to the ANC_T 460 using an A9-Update-A8-Ack message.

In step 4*v*, after the success in stopping the old accounting session, the PDSN 440 sends a request for starting a new accounting session for the handoff to the AAA 480.

In step 4*w*, the AAA 480 notifies the success in starting a new accounting session using an Accounting Response message.

Steps 4*x* and 4*y* correspond to an alternative accounting session management method compared to the method corresponding to the steps 4*s* to 4*w*. While steps 4*s* to 4*w* correspond to a scheme of stopping the old accounting session and starting a new accounting session, steps 4*x* and 4*y* correspond to a scheme of generating an interim accounting record using the intact old accounting session. In step 4*x*, The PDSN 440 transmits a request for the interim accounting session to the AAA 480.

In step 4*y*, the AAA 480 transmits an Accounting Response message to the PDSN 440 in response to the request for the interim accounting session.

In step 4*z*, the PDSN 440 transmits an A11-Registration Update (RRU) message to a PCF_S 430 to release the A10 connection with the PCF_S 430.

In step 4*aa*, the PCF_S 430 transmits an A11-Registration ACK (RRA) in response to the A11-Registration Update.

In step 4*bb*, to release the serving R-P session, the PCF_S 430 sets a lifetime to '0' and transmits an A11-Registration Request message with lifetime='0' to the PDSN 440.

In step 4*cc*, after successfully handling the A10 connection release request from the PCF_S 430, the PDSN 440 transmits the result to the PCF_S 430 using an A11-Registration Reply.

In step 4*dd*, after releasing the R-P session with the PDSN 440, the PCF_S 430 initiates an A8 connection release procedure with the ANC_S 420, and transmits an A9-Disconnect-A8 message to the ANC_S 420.

In step 4*ee*, upon receipt of the A9-Disconnect-A8 message from the PCF_S 430, the ANC_S 420 transmits an A9-Release-A8 message to the PCF_S 430 to initiate an A8 connection setup procedure.

In step 4*ff*, upon receipt of the A8 connection release request from the ANC_S 420, the PCF_S 430 handles the received message and then transmits the result to the ANC_S 420 using an A9-Release-A8 Complete message.

In step 4*gg*, after releasing the connection with the upper layer's network element, the ANC_S 420 transmits a resource release request (ResRleaseReg) message to the BTS_S 410 to release the radio resources allocated to the AT.

In step 4*hh*, upon receipt of the resource allocation request from the ANC_S 420, the BTS_S 410 performs a resource release operation and then notifies the result to the ANC_S 420 via a resource release response (ResRleaseResp) message.

Figure 5A:
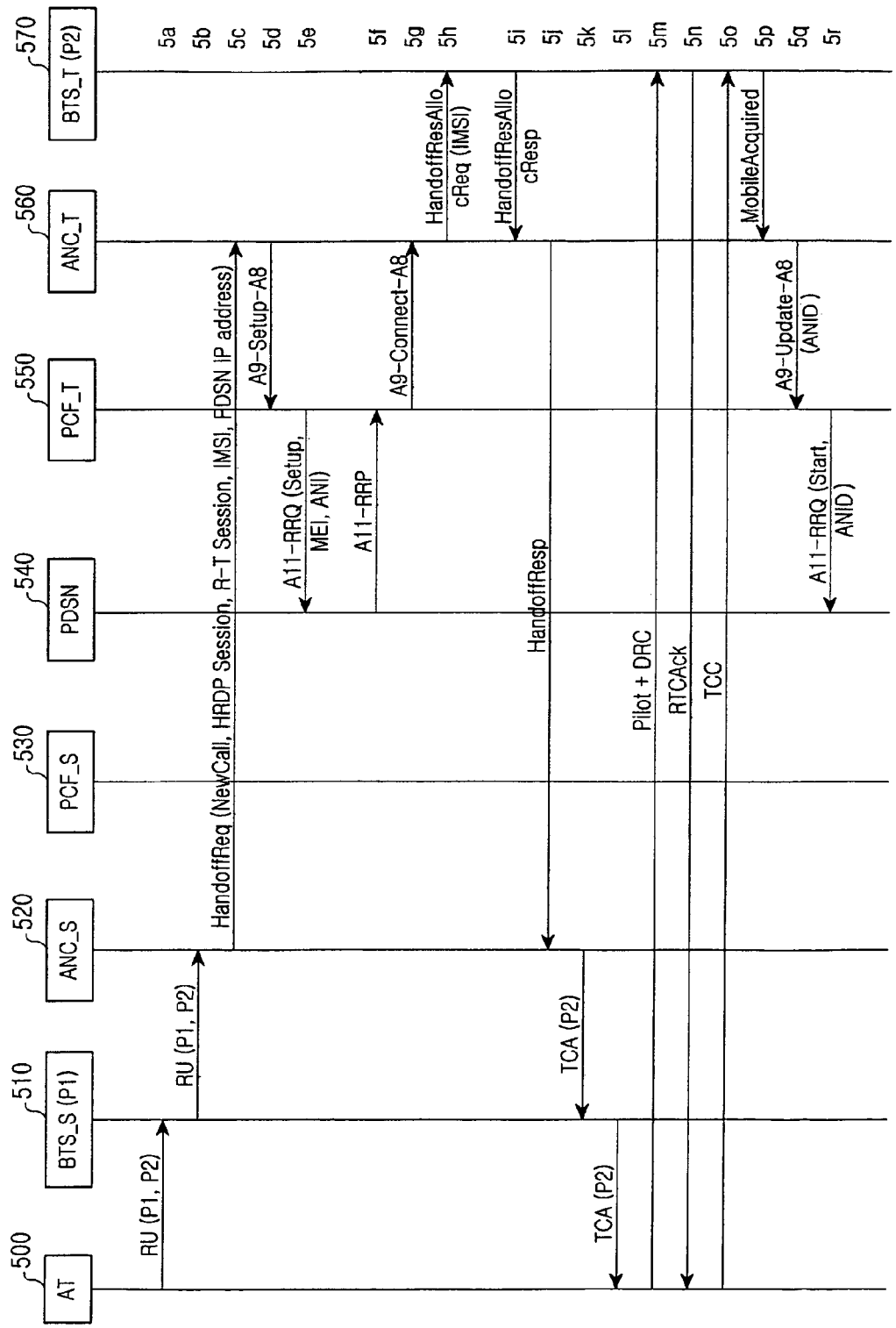
FIGS. 5A and 5B are call flow diagrams illustrating a serving R-P session release handoff operation initiated by a PCF according to an exemplary embodiment of the present invention.
Figure 5B:
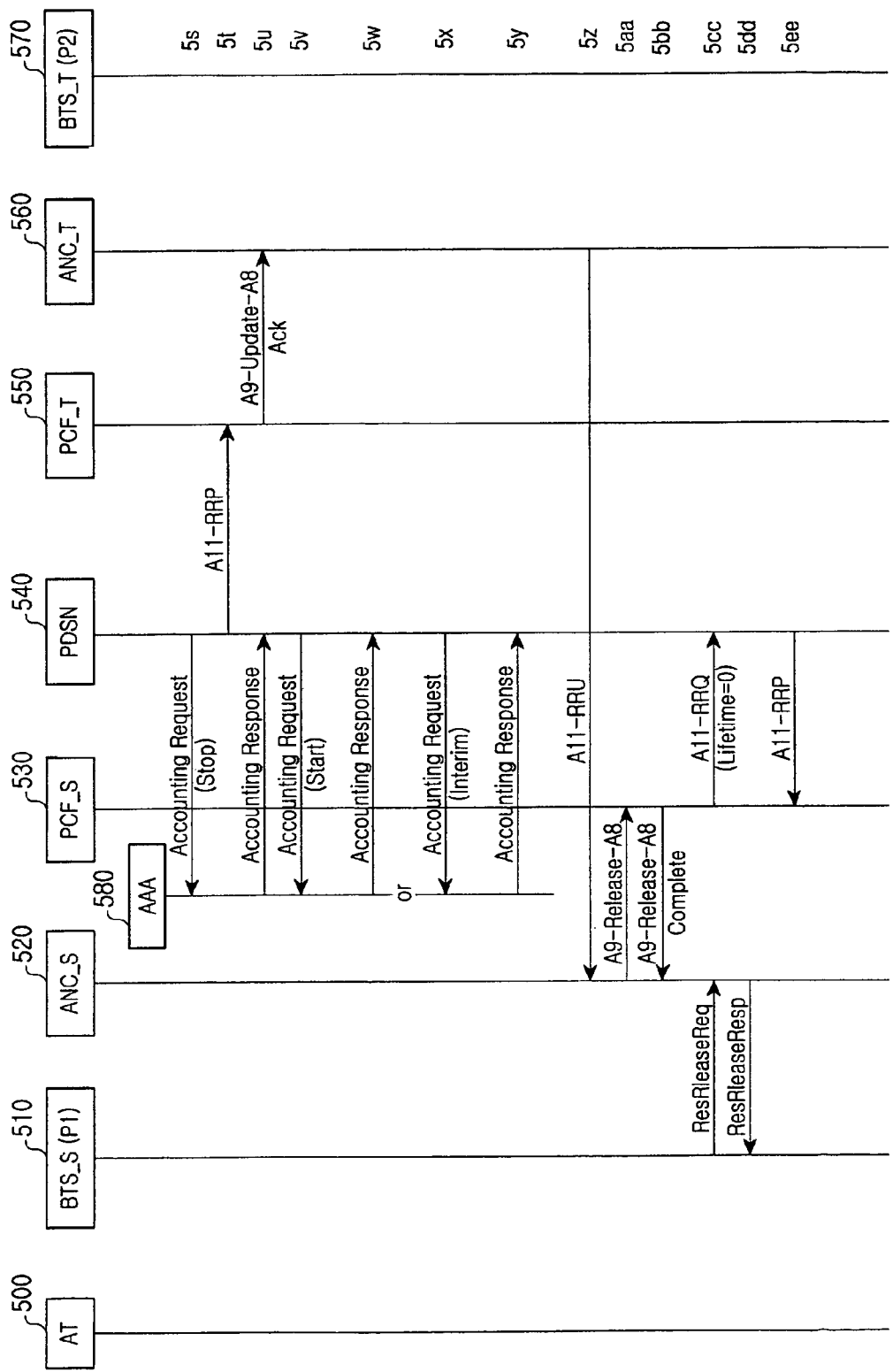

FIGS. 5A and 5B are call flow diagrams illustrating a serving R-P session release handoff operation initiated by a PCF according to an exemplary embodiment of the present invention. In this scheme, an R-P session release procedure between a PDSN and a serving PCF is initiated by a PCF.

Referring to FIGS. 5A and 5B, in step 5*a*, if there is a condition that an AT 500 defining a pilot P1 as a serving cell adds a target pilot P2 from a home cell to a pilot set, manages the pilot set, and transmits a RouteUpdate message for handoff, the AT 500 transmits a RouteUpdate message including P1 and P2 information to a serving cell (BTS_S) 510.

In step 5*b*, upon receipt of the RouteUpdate message from the AT 500, the BTS_S 510 transmits the received RouteUpdate message to a serving ANC (ANC_S) 520, for a handoff process.

In step 5*c*, upon receipt of the RouteUpdate message from the BTS_S 510, the ANC_S 520 transmits a HandoffReq message for the handoff process to a target ANC (ANC_T) 560, determining that the pilot P2 is a home cell belonging to the ANC_T 560 by parsing the pilot information included in the received RouteUpdate message. Because an accounting rate in a public cell may differ from an accounting rate in a home cell, the included information includes a Newcall indicator for enabling generation of a new accounting session from a PCF_T 550 to a PDSN 540, an HRPD session of an AT, R-T session information, and AT information (IMSI) used for performing call permission in response to a handoff request from a target cell. Further, a PSDN IP address may be included.

In step 5*d*, upon receipt of the handoff request from the ANC_S 520, the ANC_T 560 transmits an A9-Setup-A8 message used for setting up a new A8 connection with the PCF_T 550.

In step 5*e*, upon receipt of the A9-Setup-A8 message from the ANC_T 560, the PCF_T 550 transmits an A11-Registration Request message used for setting up a new A10 connection with the PDSN 540. The A11-Registration Request message includes an Access Network Identifier and a Mobility Indicator of an AT needed by the PDSN 540 for generating an accounting data record.

In step 5*f*, the PDSN 540 transmits an A11-Registration Reply to the PCF_T 550 in response to the received A11-Registration Request.

In step 5*g*, after the success in setting up the A10 connection, the PCF_T 550 transmits a response to the A8 connection setup request to the ANC_T 560 via an A9-Connect-A8 message.

In step 5*h*, after the success in performing A8/A10 connection setup to the upper layer, the ANC_T 560 sends a resource allocation request for handoff to a BTS_T 570. The resource allocation request includes AT information used for performing call permission in the BTS_T 570. Steps 5*d* to 5*h* may be performed in parallel, and may change in order according to an implementation scheme.

In step 5*i*, upon receipt of the resource allocation request, the 570 performs resource allocation, and then notifies the corresponding result to the ANC_T 560 via a handoff resource allocation response message.

In step 5*j*, after the success in resource allocation and connection setup for handoff, the ANC_T 560 notifies the corresponding result to the ANC_S 520, informing of the preparation for the handoff, via a handoff response message.

In step 5*k*, upon receipt of the information indicating the preparation for the handoff from the ANC_T 560, the ANC_S 520 transmits to the BTS_S 510 a TrafficChannelAssignment message generated to include the corresponding information targeting the AT 500. The TrafficChannelAssignment message includes resource information for the target pilot P2.

In step 5*l*, the BTS_S 510 transmits the TrafficChannelAssignment message received from the ANC_S 520 to the AT 500.

In step 5*m*, upon receipt of the TrafficChannelAssignment message transmitted from the BTS_S 510, the AT 500 handles the received message and transmits a pilot channel and a DRC channel for the pilot P2.

In step 5*n*, upon receipt of the pilot and the DRC from the AT 500, the BTS_T 570 notifies of the success in uplink acquisition to the AT 500 using an RTCAck message.

In step 5*o*, after detecting the success in uplink acquisition, the AT 500 notifies of the success in handoff by transmitting a TrafficChannelComplete message to the BTS_T 570.

In step 5*p*, upon receipt of the TrafficChannelAssignment message from the AT 500, the BTS_T 570 notifies of the success in handoff of the AT 500 to the ANC_T 560 using a MobileAcquired. This procedure may be performed immediately after the BTS_T 570 receives the pilot and the DRC from the AT 500.

In step 5*q*, after detecting the successful completion of handoff of the AT 500, the ANC_T 560 notifies the corresponding result to the PCF_T 550 using an A9-Update-A8 message for an accounting start in the home cell for the corresponding AT 500. The A9-Update-A8 message may also include an Access Network Identifier for the home cell. The differentiated accounting may start in steps 5*d* and 5*e* when the handoff starts. In this case, an Airlink record type transmitted to the PDSN 540 in step 5*e* includes a start record as well as a setup record.

In step 5*r*, upon receipt of the A9-Update-A8 message notifying the accounting start from the PCF_T 560, the PCF_T 550 sends a request for stopping the old accounting session using an A11-Registration Request message to notify start of an accounting session based on a new accounting rate to PDSN 540.

In step 5*s*, upon receipt of the new accounting session start request from the PCF_T 550, the PDSN 540 sends sends a request for stopping an old accounting session to the AAA 580.

In step 5*t*, upon receipt of the new accounting session start request from the PCF_T 550, the PDSN 540 sends an A11-Registration Reply message to the PCF_T 550 in response to the new accounting session start request.

In step 5*u*, upon receipt of the stop request for the old accounting session from the PDSN 540, the AAA 580 transmits the corresponding result to the PDSN 540 using an Accounting Response message. Also, upon receipt of a response to the new accounting session start request from the PDSN 540, the PCF_T 550 sends an A9-Update-A8-Ack message to the ANC_T 560 in response thereto.

In step 5*v*, after the success in stopping the old accounting session, the PDSN 540 sends a request for starting a new accounting session for the handoff to the AAA 580.

In step 5*w*, the AAA 580 notifies of the success in starting a new accounting session using an Accounting Response message.

Steps 5*x* and 5*y* correspond to an alternative accounting session management method compared to the method corresponding to the steps 5*s* to 5*w*. While steps 5*s* to 5*w* correspond to a scheme of stopping the old accounting session and starting a new accounting session, steps 5*x* and 5*y* correspond to a scheme of generating an interim accounting record using the intact old accounting session. In step 5*x*, the PDSN 540 transmits a request for the interim accounting session to the AAA 580.

In step 5*y*, the AAA 580 transmits an Accounting Response message to the PDSN 540 in response to the request for the interim accounting session.

In step 5*z*, in order to release resources in the serving system as the handoff ends, the ANC_T 560 transmits a A11-RRU message to the ANC_S 520 to notify of the end of the handoff. This message can be transmitted any time after step 5*t*.

In step 5*aa*, upon receipt of the A11-RRU message from the ANC_T 560, the ANC_S 520 initiates the A8 access release procedure and transmits an A9-Release-A9 message to a PCF_S 530.

In step 5*bb*, upon receipt of the A8 access release request from the ANC_S 520, the PCF_S 530 handles the received message and then transmits an A9-Release-A8 Complete message to the ANC_S 520 in response thereto.

In step 5*cc*, upon receipt of the A8 access release request from the ANC_S 520, the PCF_S 530 sets a lifetime to '0' and transmits an A11-Registration Request message with lifetime='0' to release the serving R-P session with the PDSN 540. After completion of the A8 connection release, the BTS_S 510 transmits a ResRleaseReq message for requesting resource release to the ANC_S 520 to release the radio resources allocated to the AT 500.

In step 5*dd*, after the success in the resource release request, the ANC_S 520 notifies the result to the BTS_S 510 by transmitting a ResRleaseResp message.

In step 5*ee*, upon receipt of the serving A10 access release request, the PDSN 540 handles the received message and then notifies the result to the PCF_S 530 using an A11-Registration Reply message.

Next, after the handoff ends, a handoff operation in one PCF is divided into two operations according to the subject of initiating the procedure for releasing an A8 connection between a PCF and a serving ANC.

Figure 6A:
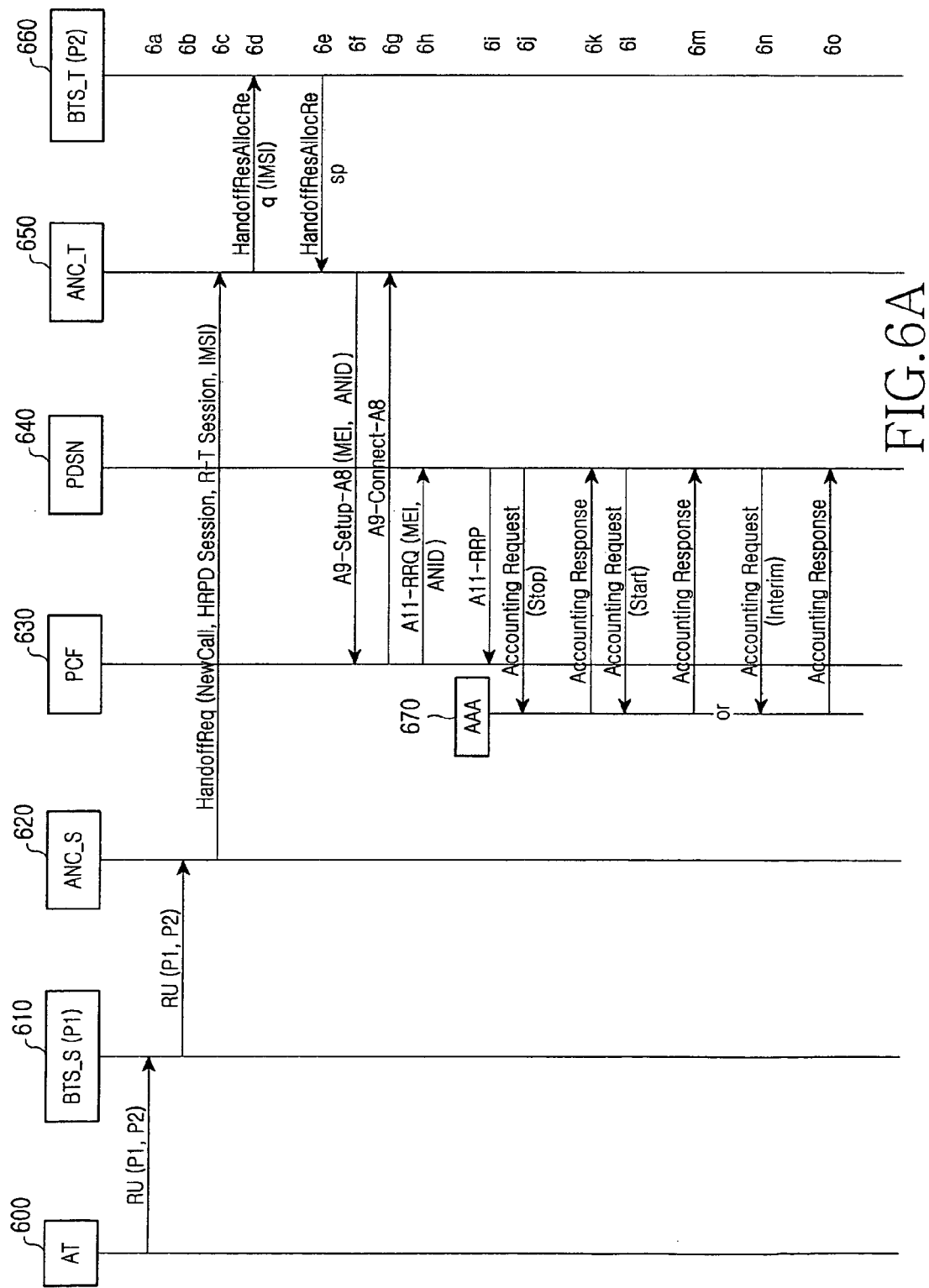
FIGS. 6A and 6B are call flow diagrams illustrating a serving A8 connection release handoff operation initiated by a PCF according to an exemplary embodiment of the present invention.
Figure 6B:
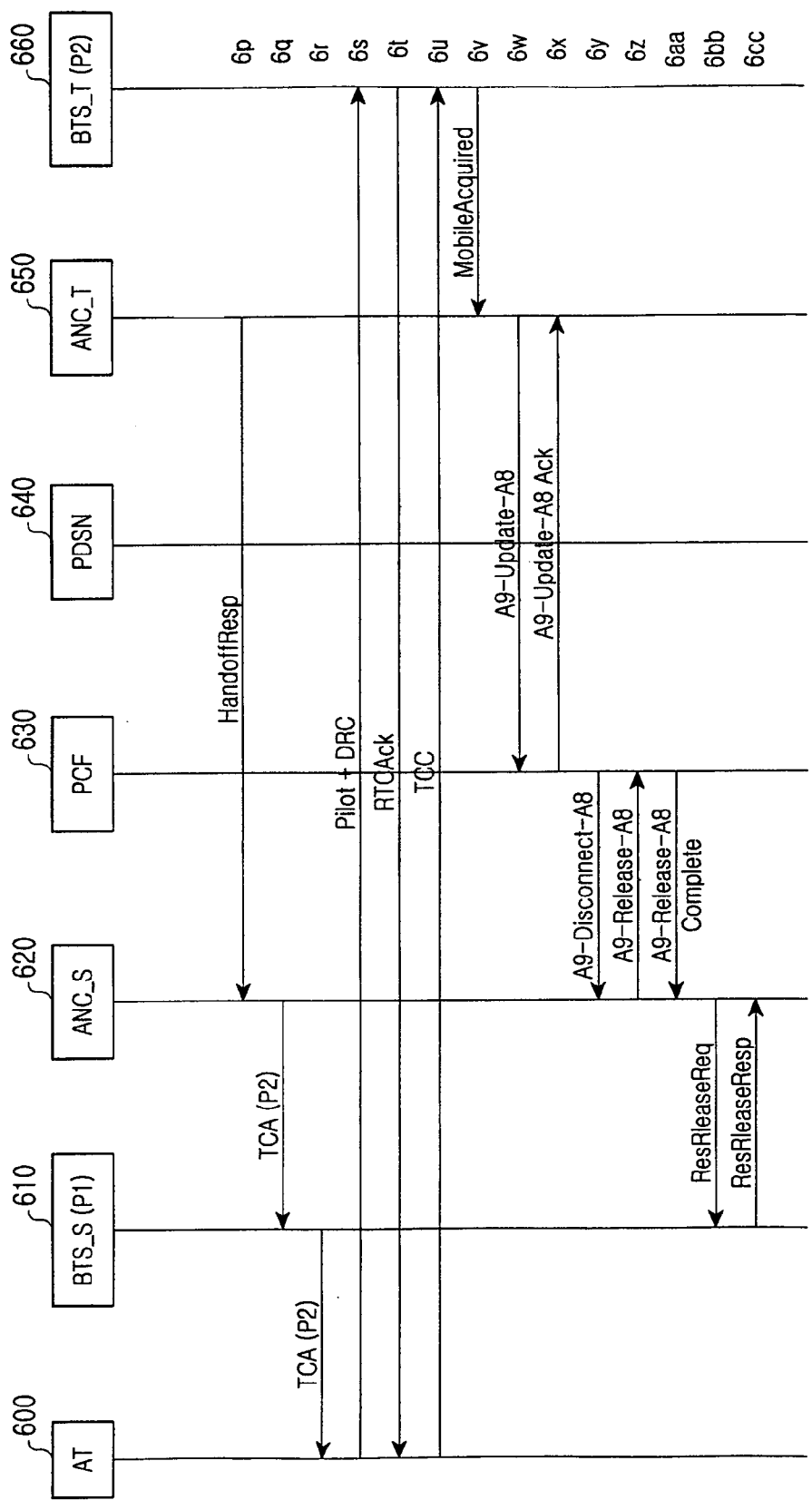

FIGS. 6A and 6B are call flow diagrams illustrating a serving A8 connection release handoff operation initiated by a PCF according to an exemplary embodiment of the present invention. In this case, an A8 connection release between a serving ANC and a PCF is initiated by the PCF.

Referring to FIGS. 6A and 6B, in step 6*a*, if there is a condition that an AT 600 defining a pilot P1 as a serving cell adds a target pilot P2 from a home cell to a pilot set, manages the pilot set, and transmits a RouteUpdate message for handoff, the AT 600 transmits a RouteUpdate message including P1 and P2 information to a serving cell (BTS_S) 610.

In step 6*b*, upon receipt of the RouteUpdate message from the AT 600, the BTS_S 610 transmits the received RouteUpdate message to a serving ANC (ANC_S) 620, for a handoff process.

In step 6*c*, upon receipt of the RouteUpdate message from the BTS_S 610, the ANC_S 620 transmits a HandoffReq message for the handoff process to a target ANC (ANC_T) 650, determining that the pilot P2 is a home cell belonging to the ANC_T 650 by parsing the pilot information included in the received RouteUpdate message. Because an accounting rate in a public cell may differ from an accounting rate in a home cell, the included information includes a NewCall indicator for enabling generation of a new accounting session from a PCF to a PDSN, an HRPD session of an AT, R-T session information, and AT information (IMSI) used for performing call permission in response to a handoff request from a target cell.

In step 6*d*, the ANC_T 650 transmits a HandoffResAllocReq message for resource allocation request to the BTS_T 660 in response the handoff request received from the ANC_S 620. The HandoffResAllocReq message includes information on the AT 600 for call permission control in the home cell.

In step 6*e*, the BTS_T 660 allocates resources, and then notifies the result to the ANC_T 650 using a HandoffResAllocResp message.

In step 6*f*, after being allocated the resources, the ANC_T 650 transmits an A9-Setup-A8 message for A8 connection setup with a PCF 630, along with a Mobility Indicator of the AT 600 and an identifier of the target cell.

In step 6*g*, the PCF 630 transmits an A9-Connect-A8 message to the ANC_T 650 in response to the A8 connection request from the ANC_T 650.

In step 6*h*, after completion of setting up a new A8 connection with the ANC_T 650, the PCF 630 transmits an A11-Registration Request message to a PDSN 640 to notify of movement of the AT 600, including the MEI and ANID.

In step 6*i*, the PDSN 640 transmits an A11-Registration Reply message in response to the A11-Registration Request message from the PCF 630.

In step 6*j*, the PDSN 640 sends a request for stopping the old accounting session to an AAA 670 to apply a changed accounting rate in the target cell.

In step 6*k*, upon receipt of the stop request for the old accounting session, the AAA 670 sends an Accounting Response message to the PDSN 640 in response thereto.

In step 6*l*, because the accounting rate may be subject to change as the AT 600 moves, the PDSN 640 sends a request for starting a new accounting session to the AAA 670.

In step 6*m*, the AAA 670 transmits the processing result for the new accounting session to the PDSN 640 using an Accounting Response message.

Steps 6*n* and 6*o* are alternative scheme of using an accounting session that corresponds to steps 6*j* to 6*m*, for the case where the accounting rate is changed due to a handoff. The scheme includes a replacing the old accounting session with a new accounting session, or generating an interim accounting record and processing it later together. In 6*n* corresponding to the scheme of generating an interim record, the PDSN 640 generates and transmits an interim accounting record to the AAA 670.

In step 6*o*, upon receipt of the interim accounting record from the PDSN 640, the AAA 670 notifies the processing result to the PDSN 640.

In step 6*p*, the ANC_T 650 notifies the ANC_S 620 of the success in resource allocation for the handoff.

In step 6*q*, upon receipt of the information indicating the success in resource allocation from the ANC_T 650, the ANC_S 620 generates a TrafficChannelAssignment message including the corresponding resource information, and transmits the TrafficChannelAssignment message to the BTS_S 610.

In step 6*r*, the BTS_S 610 transmits the TrafficChannelAssignment message received from the ANC_S 620 to the AT 600.

In step 6*s*, upon receipt of the TrafficChannelAssignment message from the BTS_S 610, the AT 600 transmits an uplink pilot and DRC to the BTS_T 660.

In step 6*t*, upon receipt of the uplink pilot and DRC from the AT 600, the BTS_T 660 acquires an uplink and transmits an RTCAck message to the AT 600.

In step 6*u*, upon receipt of the RTCAck message from the BTS_T 660, the AT 600 notifies the success in channel acquisition to the BTS_T 660 using a TrafficChannelComplete message.

In step 6*v*, the BTS_T 660 notifies of the success in channel acquisition to the ANC_T 650 via a MobileAcquired message. This procedure can be performed any time after the BTS_T 660 receives the uplink pilot and DRC from the AT 600.

In step 6*w*, the ANC_T 650 transmits an A9-Update-A8 message to the PCF 630 in order to notify of the possibility of starting the accounting as the AT 600 ends the handoff. The accounting time can be the time when the ANC_T 650 transmits an initial A9-Update-A8 message.

In step 6*x*, the PCF 630 transmits an A9-Update-A8-Ack message to the ANC_T 650 in response to the A9-Update-A8 message.

In step 6*y*, as the handoff ends, the PCF 630 transmits an A9-Disconnect-A8 message to ANC_S 620 as a procedure for releasing the resources for the BTS_S 610.

In step 6*z*, the ANC_S 620 transmits an A9-Release-A8 message for release of an A8 connection to the PCF 630.

In step 6*aa*, the PCF 630 transmits an A9-Release-A8-Complete message to the ANC_S 620 in response to the A9-Release-A8 message.

In step 6*bb*, after releasing the connection with the upper layer's network element, the ANC_S 620 transmits a ResRleaseReq message to the BTS_S 610 in order to release the radio resources allocated to the AT 600.

In step 6*cc*, after the success in performing the resource release request from the ANC_S 620, the BTS_S 610 transmits a ResRleaseResp message to notify the processing result.

Figure 7A:
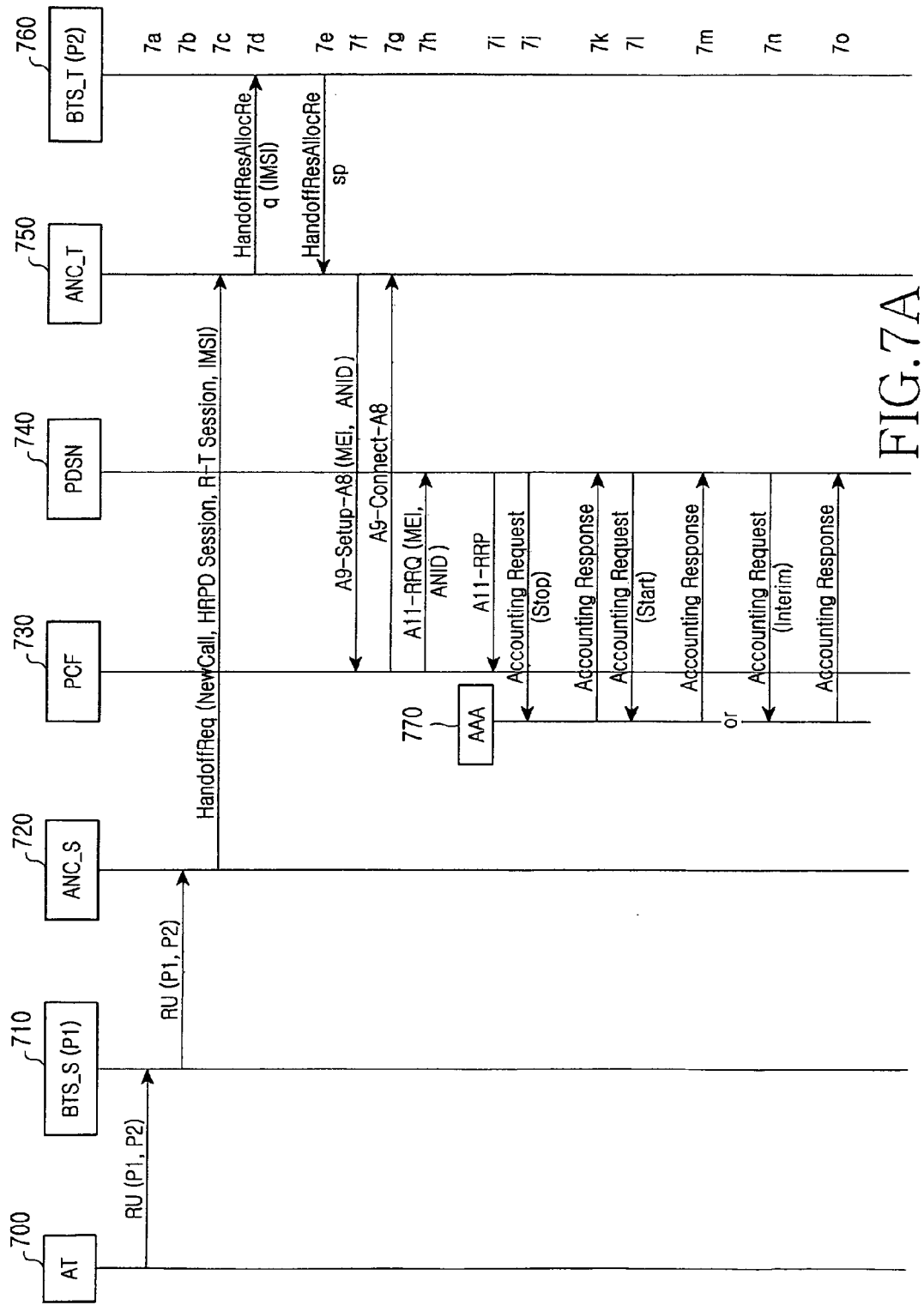
FIGS. 7A and 7B are call flow diagrams illustrating a serving A8 connection release handoff operation initiated by an ANC according to an exemplary embodiment of the present invention.
Figure 7B:
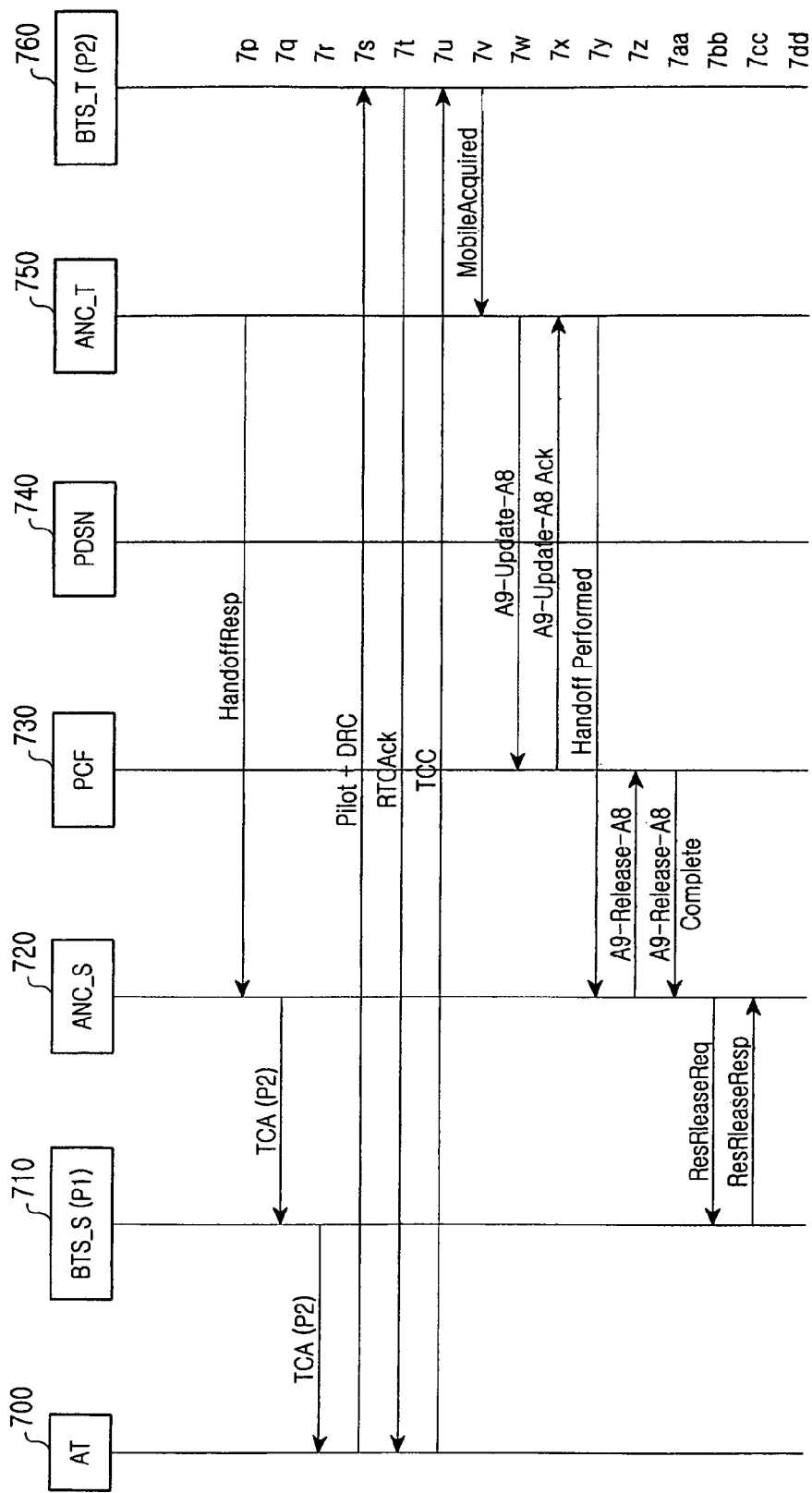

FIGS. 7A and 7B are call flow diagrams illustrating a serving A8 connection release handoff operation initiated by an ANC according to an exemplary embodiment of the present invention. In this case, a procedure for releasing a serving A8 connection after an end of handoff is initiated by the ANC.

Referring to FIGS. 7A and 7B, in step 7*a*, if there is a condition that an AT 700 defining a pilot P1 as a serving cell adds a target pilot P2 from a home cell to a pilot set, manages the pilot set, and transmits a RouteUpdate message for handoff, the AT 700 transmits a RouteUpdate message including P1 and P2 information to a serving cell (BTS_S) 710.

In step 7*b*, upon receipt of the RouteUpdate message from the AT 700, the BTS_S 710 transmits the received RouteUpdate message to a serving ANC (ANC_S) 720, for a handoff process.

In step 7*c*, upon receipt of the RouteUpdate message from the BTS_S 710, the ANC_S 720 transmits a HandoffReq message for the handoff process to a target ANC (ANC_T) 750, determining that the pilot P2 is a home cell belonging to the ANC_T 750 by parsing the pilot information included in the received RouteUpdate message. Because an accounting rate in a public cell may differ from an accounting rate in a home cell, the included information includes a Newcall indicator for enabling generation of a new accounting session from a PCF 730 to a PDSN 740, an HRPD session of an AT, R-T session information, and AT information (IMSI) used for performing call permission in response to a handoff request from a target cell.

In step 7*d*, the ANC_T 750 transmits a HandoffResAllocReq message for resource allocation request to the BTS_T 760 in response the handoff request received from the ANC_S 720. The HandoffResAllocReq message includes information (IMSI) on the AT 700 for call permission control in the home cell.

In step 7*e*, the BTS_T 760 allocates resources, and then notifies the result to the ANC_T 750 using a HandoffResAllocResp message.

In step 7*f*, after being allocated the resources, the ANC_T 750 transmits an A9-Setup-A8 message for A8 connection setup with the PCF 730, along with a Mobility Indicator of the AT 700 and an identifier (ANID) of the target cell.

In step 7*g*, the PCF 730 transmits an A9-Connect-A8 message to the ANC_T 750 in response to the A8 connection request from the ANC_T 750.

In step 7*h*, after completion of setting up a new A8 connection with the ANC_T 750, the PCF 730 transmits an A11-Registration Request message to the PDSN 740 to notify movement of the AT 700, including the MEI and ANID.

In step 7*i*, the PDSN 740 transmits an A11-Registration Reply message in response to the A11-Registration Request message from the PCF 730.

In step 7*j*, the PDSN 740 sends a request for stopping the old accounting session to an AAA 770 to apply a changed accounting rate in the target cell.

In step 7*k*, upon receipt of the stop request for the old accounting session, the AAA 770 sends an Accounting Response message to the PCF 730 in response thereto.

In step 7*l*, because the accounting rate may be subject to change as the AT 700 moves, the PDSN 740 sends a request for starting a new accounting session to the AAA 770.

In step 7*m*, the AAA 770 transmits the processing result for the new accounting session to the PDSN 740 using an Accounting Response message.

Steps 7*n* and 7*o* are an alternative scheme of using an accounting session that corresponds to steps 7*j* to 7*m*, for the case where the accounting rate is changed due to a handoff. The scheme includes replacing the old accounting session with a new accounting session, or generating an interim accounting record and processing it later together. In 7*n* and 7*o* corresponding to the scheme of generating an interim record, the PDSN 740 generates and transmits an interim accounting record to the AAA 770.

In step 7*o*, upon receipt of the interim accounting record from the PDSN 740, the AAA 770 notifies of the processing result to the PDSN 740 via an accounting response message.

In step 7*p*, the ANC_T 750 notifies the ANC_S 720 of the success in resource allocation for the handoff via a HandoffResp message.

In step 7*q*, upon receipt of the information indicating the success in resource allocation from the ANC_T 750, the ANC_S 720 generates a TrafficChannelAssignment message including the corresponding resource information, and transmits the TrafficChannelAssignment message to the BTS_S 710.

In step 7*r*, the BTS_S 710 transmits the TrafficChannelAssignment message received from the ANC_S 720 to the AT 700.

In step 7*s*, upon receipt of the TrafficChannelAssignment message from the BTS_S 710, the AT 700 transmits an uplink pilot and DRC to the BTS_T 760.

In step 7*t*, upon receipt of the uplink pilot and DRC from the AT 700, the BTS_T 760 acquires an uplink and transmits an RTCAck message to the AT 700.

In step 7*u*, upon receipt of the RTCAck message from the BTS_T 760, the AT 700 notifies of the success in traffic channel acquisition to the BTS_T 760 using a TrafficChannelComplete message.

In step 7*v*, the BTS_T 760 notifies of the success in channel acquisition to the ANC_T 750 via a MobileAcquired message. This procedure can be performed any time after the BTS_T 760 receives the uplink pilot and DRC from the AT 700.

In step 7*w*, the ANC_T 750 transmits an A9-Update-A8 message to the PCF 730 in order to notify the possibility of starting the accounting as the AT 700 ends the handoff. The accounting time can be the time when the ANC_T 750 transmits an initial A9-Update-A8 message.

In step 7*x*, the PCF 730 transmits an A9-Update-A8-Ack message to the ANC_T 750 in response to the A9-Update-A8 message.

In step 7*y*, the ANC_T 750 transmits a HandoffPerformed message to notify the end of the handoff to the ANC_S 720.

In step 7*z*, the ANC_S 720 transmits an A9-Release-A8 message for release of an A8 connection to the PCF 730.

In step 7*aa*, the PCF 730 transmits an A9-Release-A8-Complete message to the ANC_S 720 in response to the A9-Release-A8 message.

In step 7*bb*, after releasing the connection with the upper layer's network element, the ANC_S 720 transmits a ResRleaseReq message to the BTS_S 710 in order to release the radio resources allocated to the AT 700.

In step 7*cc*, after the success in performing the resource release request from the ANC_S 720, the BTS_S 710 transmits a ResRleaseResp message to notify of the processing result.

Figure 8:
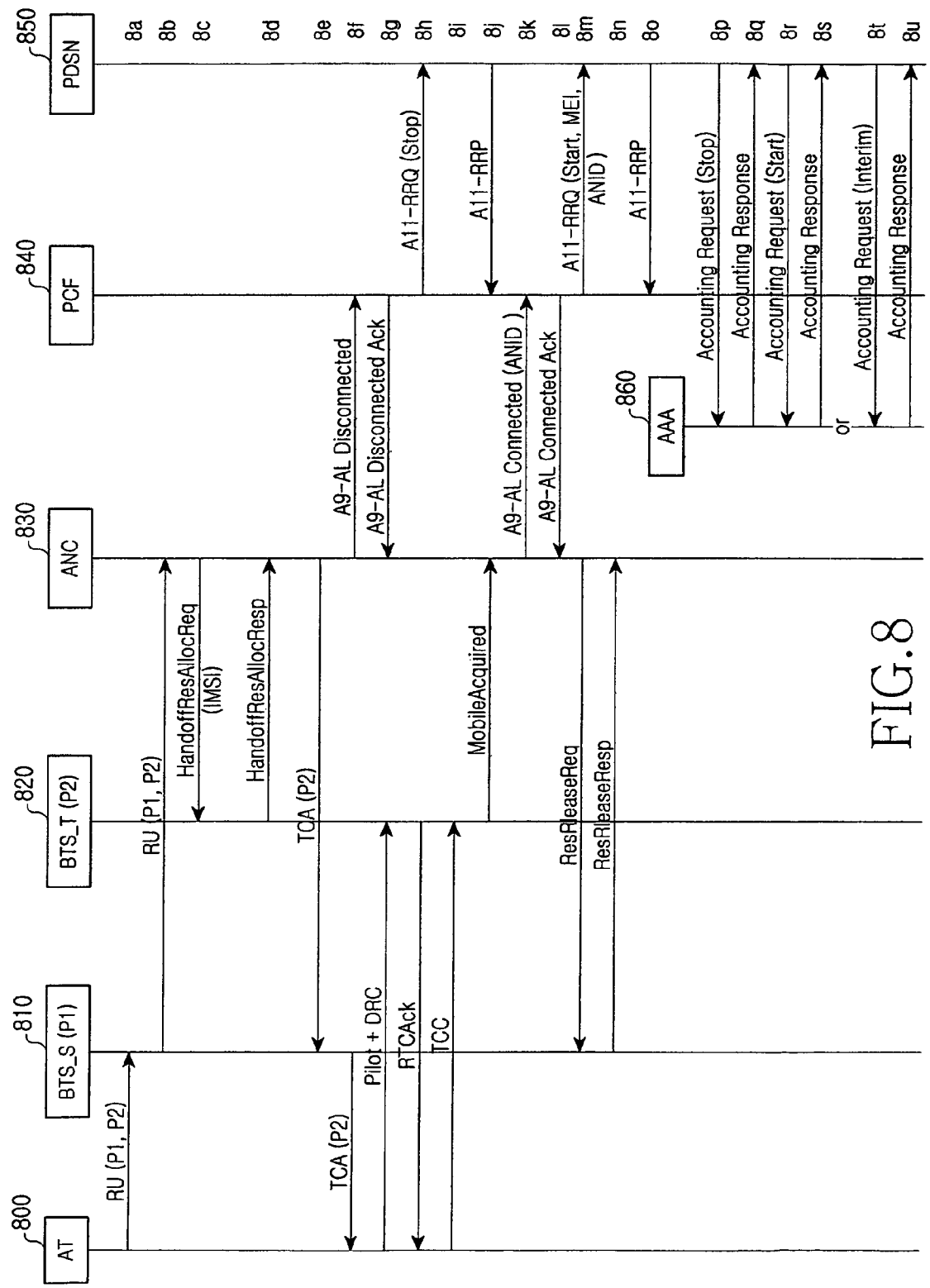
FIG. 8 is a call flow diagram illustrating an operation between same/different ANCs according to an exemplary embodiment of the present invention.

FIG. 8 is a call flow diagram illustrating an operation between same/different ANCs according to an exemplary embodiment of the present invention.

Referring to FIG. 8, in step 8*a*, if there is a condition that an AT 800 defining a pilot P1 as a serving cell adds a target pilot P2 from a home cell to a pilot set, manages the pilot set, and transmits a RouteUpdate message for handoff, the AT 800 transmits a RouteUpdate message including P1 and P2 information to a serving cell (BTS_S) 810.

In step 8*b*, upon receipt of the RouteUpdate message from the AT 800, the BTS_S 810 transmits the received RouteUpdate message to an ANC 830, for a handoff process.

In step 8*c*, upon receipt of the RouteUpdate message, the ANC 830 transmits a HandoffResAllocReq message to a BTS_T 820 for resource allocation. The HandoffResAllocReq message includes AT information (IMSI) for call permission control in the BTS_T 820.

In step 8*d*, in response to the resource allocation request from the ANC 830, the BTS_T 820 performs the resource allocation procedure including the call permission control, and transmits the corresponding result to the ANC 830 using a HandoffResAllocResp message.

In step 8*e*, the ANC 830 transmits a TrafficChannelAssignment message including resource information of the target cell to the BTS_S 810.

In step 8*f*, upon receipt of the TrafficChannelAssignment message from the ANC 830, the BTS_S 810 transmits the received message to the AT 800. The ANC 830 transmits an A9-AL Disconnect message to a PCF 840 to notify of an air link loss due to occurrence of handoff and to notify of the occurrence of the handoff.

In step 8*g*, upon receipt of the TrafficChannelAssignment message, the AT 800 transmits an uplink pilot and DRC to the target cell. Upon receipt of the A9-AL Disconnected message, the PCF 840 transmits an A9-AL Disconnected Ack message to the ANC 830 in response thereto.

In step 8*h*, upon receipt of the uplink pilot and DRC from the AT 800, the target cell notifies the success in uplink acquisition by transmitting an RTCAck message to the AT 800. For the possibility of a change in the accounting rate due to the handoff, the PCF 840 sends a request for stopping the old accounting session to the PDSN 850 via an A11-RRQ (stop) message.

In step 8*i*, upon receipt of the RTCAck message from the BTS_T 820, the AT 800 transmits a TrafficChannelComplete message to notify the success in performing handoff.

In step 8*j*, upon receipt of the TrafficChannelComplete message from the AT 800, the BTS_T 820 notifies the success in uplink acquisition to the ANC 830. Upon receipt of the stop request for the old accounting session, the PDSN 850 transmits an A11-Registration Reply message in response thereto.

In step 8*k*, upon receipt of the information indicating the success in handoff of the AT 800 from the BTS_T 820, the ANC 830 transmits an A9-AL Connected message to the PCF 840.

In step 8*l*, upon receipt of the A9-AL Connected message, the PCF 840 transmits an A9-AL Connected Ack message to the ANC 830 in response thereto.

In step 8*m*, as the handoff ends, the PCF 840 transmits an A11-Registration Request message to the PDSN 850 to request start of generating a new accounting record, including Start, MEI and AND information. As the handoff ends, the ANC 830 transmits a ResRleaseReq message to the serving cell to release the resources in the serving cell.

In step 8*n*, after the success in performing the resource release request from the ANC 830, the BTS_S 810 notifies of the result by transmitting a ResRleaseResp message.

In step 8*o*, the PDSN 850 transmits an A11-Registration Reply message to the PCF 840 in response to the start request for generating a new accounting record.

In step 8*p*, as the handoff ends, the PDSN 850 sends a request for stopping the old accounting session for the accounting session in the AAA 860.

In step 8*q*, the AAA 860 transmits an Accounting Response message in response to the request of the PDSN 850.

In step 8*r*, upon receipt of the response to the request for stopping the old accounting session, the PDSN 850 sends a request for starting the new accounting session to the AAA 860.

In step 8*s*, the AAA 860 transmits an Accounting Response message to the PDSN 850 in response to the request for the new accounting session.

In step 8*t*, the PDSN 850 sends a request for an interim accounting session to the AAA 860 as a scheme of generating an interim accounting record while using the intact old accounting session, among the schemes of using an accounting session for applying the changed accounting rate in steps 8*t* and 8*u*.

In step 8*u*, the AAA 860 transmits an accounting response message in response to the request for an interim accounting session from the PDSN 850.

Figure 9:
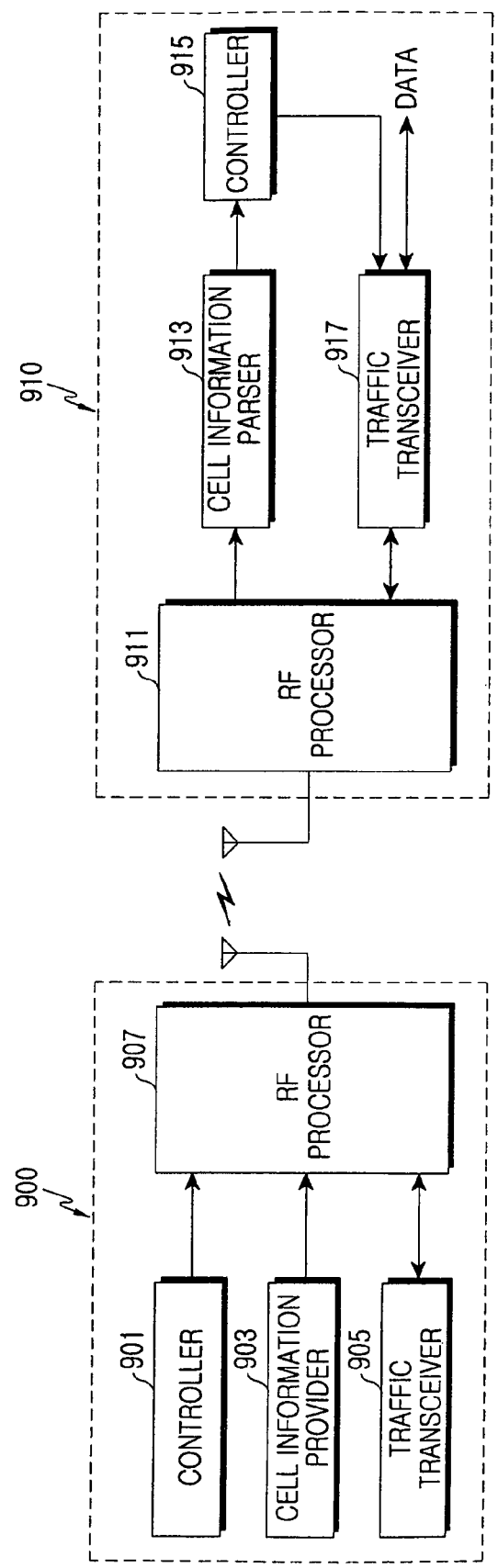
FIG. 9 is a block diagram illustrating internal structures of an AT and a BTS according to an exemplary embodiment of the present invention.

FIG. 9 is a block diagram illustrating internal structures of an AT and a BTS according to an exemplary embodiment of the present invention.

Referring to FIG. 9, a BTS 900 includes a controller 901, a cell information provider 903, a traffic transceiver 905, and a Radio Frequency (RF) processor 907.

The controller 901 processes the information provided from the cell information provider 903 and the traffic transceiver 905 such that an AT 910 can identify a home cell that can provide the differentiated service proposed in any of the exemplary embodiments of the present invention.

The cell information provider 903 is a function block for defining messages or fields including information on whether the BS 900 provides the differentiated service. The traffic transceiver 905 is a function block for allowing the BTS 900 to transmit/receive the traffic such as voice and data provided in the general mobile communication system. The RF processor 907, under the control of the controller 901, performs a series of processes. Such processes include modulation and multiplexing in the physical layer or a Media Access Control (MAC) layer, as a process for generating a frame by combining the messages and traffics redefined such that the home cell proposed in the exemplary embodiment of the present invention can be identified. Other constituent blocks, such as an Inverse Fast Fourier Transform (IFFT) unit, are not shown herein, because they do not directly relate to the gist of the exemplary embodiment of the present invention.

The AT 910 includes an RF processor 911, a cell information parser 913, a controller 915, and a traffic transceiver 917.

The RF processor 911 receives a frame transmitted from the BTS 900, and performs demultiplexing on the received frame according to a control signal from the controller 915.

The cell information parser 913, under the control of the controller 915, parses a corresponding field of the message received at the AT 910. The controller 915 performs a process of comparing a pilot signal from its own cell with a pilot signal from a neighbor cell according to the home cell identification procedure proposed in any of the exemplary embodiments of the present invention.

The traffic transceiver 917, including a buffer therein, stores the traffic data transmitted from the BTS 900. Similarly, the constituent blocks that are not directly related to the gist of the exemplary embodiment of the present invention are not illustrated herein.

As can be understood from the foregoing description, the mobile communication access network according to the exemplary embodiment of the present invention can efficiently provide a differentiated service such as per-cell call permission, call barring, differentiated accounting, and virtual zone using the subscriber's home solution such as a home cell, with the minimized modification of the current standard and other network elements.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for identifying a home cell that provides a differentiated service in a mobile communication system where public cells and home cells coexist, the method comprising the steps of:
   searching for a plurality of pilots having a strength greater than a minimum pilot strength;
   comparing strengths of the pilots, and designating a pilot having the greatest strength as an active pilot;
   determining whether a corresponding cell of the active pilot transmits a cell classifier of the home cell for providing the differentiated service along with an overhead message;
   when the corresponding cell transmits the cell classifier of the home cell, determining whether the cell classifier of the home cell matches one among cell classifiers stored in an access terminal; and
   when the cell classifier of the home cell matches with the one among the cell classifiers stored in the access terminal, receiving the differentiated service under the control of the corresponding cell,
   wherein each of the home cells corresponding to the cell classifiers stored in the access terminal provides the differentiated service to an access terminal registered and provides a non-differentiated service for the non-registered access terminal,
   wherein the differentiated service is at least one of per-call permission, call barring, differentiated accounting, and virtual zone using home solution of the access terminal.

2. The method of claim 1, further comprising the steps of:
   when the corresponding cell transmits no cell classifier or the cell classifier of the home cell does not match the one among the cell classifiers stored in the access terminal, receiving an overhead message transmitted along with cell classifier information for a neighbor cell; and
   performing a match operation on at least one received neighbor cell classifier.

3. The method of claim 1, further comprising the step of, when the cell classifier of the home cell does not match the cell classifier stored in the access terminal, maintaining the pilot having the greatest strength as an active pilot, receiving an overhead message from the corresponding cell, and performing an idle mode operation depending on the received overhead message.

4. The method of claim 1, wherein the overhead message includes home cell identification information or neighbor cell classifier information.

5. A mobile communication system for identifying a home cell that provides a differentiated service where public cells and home cells coexist, comprising:
   means for searching for a plurality of pilots having a strength greater than a minimum pilot strength;
   means for comparing strengths of the pilots, and designating a pilot having the greatest strength as an active pilot;
   means for determining whether a corresponding cell of the active pilot transmits a cell classifier of the home cell for providing the differentiated service along with an overhead message;
   means for determining whether the cell classifier of the home cell matches one among cell classifiers stored in an access terminal, wherein it is determined whether the cell classifier of the home cell matches the one among the cell classifiers stored in the access terminal when the corresponding cell transmits the cell classifier of the home cell; and
   means for receiving the differentiated service under the control of the corresponding cell, when the cell classifier of the home cell matches with one among the cell classifiers stored in the access terminal,
   wherein each of the home cells corresponding to the cell classifiers stored in the access terminal provides the differentiated service to an access terminal registered and provides a non-differentiated service for the non-registered access terminal,
   wherein the differentiated service is at least one of per-call permission, call barring, differentiated accounting, and virtual zone using home solution of the access terminal.

6. The system of claim 5, further comprising:
   means for receiving an overhead message transmitted along with cell classifier information for a neighbor cell, wherein the overhead message is received along with cell classifier information for a neighbor cell when the corresponding cell transmits no cell classifier or the cell classifier of the home cell does not match the one among the cell classifiers stored in the access terminal; and
   means for performing a match operation on at least one received neighbor cell classifier.

7. The system of claim 5, further comprising means for (a) maintaining the pilot having the greatest strength as an active pilot, (b) receiving an overhead message from the corresponding cell, and (c) performing an idle mode operation depending on the received overhead message.

8. The system of claim 5, wherein the overhead message includes home cell identification information or neighbor cell classifier information.

* * * * *